US008160795B2

(12) United States Patent
Iwatsuki et al.

(10) Patent No.: US 8,160,795 B2
(45) Date of Patent: Apr. 17, 2012

(54) DRIVE POWER CONTROL APPARATUS AND METHOD FOR VEHICLE

(75) Inventors: Kunihiro Iwatsuki, Toyota (JP); Shinya Iizuka, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 704 days.

(21) Appl. No.: 12/298,823

(22) PCT Filed: Apr. 26, 2007

(86) PCT No.: PCT/IB2007/001097
§ 371 (c)(1),
(2), (4) Date: Jan. 23, 2009

(87) PCT Pub. No.: WO2007/129173
PCT Pub. Date: Nov. 15, 2007

(65) Prior Publication Data
US 2009/0216415 A1 Aug. 27, 2009

(30) Foreign Application Priority Data
Apr. 28, 2006 (JP) ................................. 2006-125836

(51) Int. Cl.
*B60K 41/04* (2006.01)
*B60W 30/02* (2006.01)
*G06F 19/00* (2006.01)

(52) U.S. Cl. .......................................... 701/72; 701/59
(58) Field of Classification Search .................... 701/72, 701/59, 70, 211
See application file for complete search history.

(56) References Cited

U.S. PATENT DOCUMENTS

| 5,895,435 | A | 4/1999 | Ohta et al. | |
|---|---|---|---|---|
| 6,016,457 | A | 1/2000 | Toukura et al. | |
| 6,076,034 | A * | 6/2000 | Satoh et al. | 701/70 |
| 6,370,469 | B1 * | 4/2002 | Phung et al. | 701/93 |
| 6,564,140 | B2 * | 5/2003 | Ichikawa et al. | 701/91 |
| 6,836,719 | B2 * | 12/2004 | Andersson et al. | 701/93 |
| 7,027,904 | B2 | 4/2006 | Ishizu et al. | |
| 7,593,800 | B2 * | 9/2009 | Higuchi | 701/70 |
| 2001/0044696 | A1 * | 11/2001 | Saitou et al. | 701/213 |
| 2004/0015279 | A1 * | 1/2004 | Barron et al. | 701/37 |
| 2004/0093144 | A1 | 5/2004 | Ishizu et al. | |
| 2005/0111739 | A1 * | 5/2005 | Ida et al. | 382/199 |
| 2005/0222739 | A1 | 10/2005 | Mori | |

FOREIGN PATENT DOCUMENTS

| DE | 42 01 142 | 8/1992 |
|---|---|---|
| DE | 198 30 318 | 1/1999 |
| DE | 10 2004 014 102 | 10/2005 |

(Continued)

*Primary Examiner* — Tan Q Nguyen
(74) *Attorney, Agent, or Firm* — Oblon, Spivak, McClelland, Maier & Neustadt, L.L.P.

(57) ABSTRACT

A drive power control apparatus for a vehicle includes a controller that adjusts the drive power for driving a vehicle to compensate for a parameter that affects the running state of the vehicle. When the vehicle enters a region where the acceleration of the vehicle needs to be changed based on the running environment or when the vehicle is traveling in the region in which the acceleration of the vehicle needs to be changed based on the running environment, the controller makes the amount by which the drive power is adjusted less than the amount by which the drive power is adjusted when the vehicle is traveling in a region other than the region in which the acceleration of the vehicle needs to be changed based on the running environment.

29 Claims, 34 Drawing Sheets

FOREIGN PATENT DOCUMENTS

| | | |
|---|---|---|
| GB | 2 319 635 | 5/1998 |
| JP | 1 197132 | 8/1989 |
| JP | 9 42002 | 2/1997 |
| JP | 11 229917 | 8/1999 |
| JP | 2000 27682 | 1/2000 |
| JP | 2000 142180 | 5/2000 |
| JP | 3 107752 | 9/2000 |
| JP | 2004 156467 | 6/2004 |
| JP | 2004 204832 | 7/2004 |

* cited by examiner

ENGINE TORQUE CHARACTERISTIC MAP

FIG. 5

CORRECTION COEFFICIENT SETTING MAP

| \| LATERAL ACCELERATION \| | 0.0 | 0.4 | 0.8 | >0.8 |
|---|---|---|---|---|
| COEFFICIENT | 1.0 | 0.5 | 0.0 | 0.0 |

FIG.8

CORNERING RESISTANCE MAP

| \| LATERAL ACCELERATION \| G | 0 | 0.2 | 0.4 | 0.8 |
|---|---|---|---|---|
| CORNERING RESISTANCE N | 0 | 1000 | 2000 | 2800 |

EXAMPLE OF METHOD FOR OBTAINING INFORMATION USING NAVIGATION SYSTEM

INFORMATION ON RADIUSES OF CURVE AHEAD OF VEHICLE BY PREDETERMINED DISTANCE (M) IS OBTAINED IN REAL TIME

R200 R100 R150

VEHICLE

FIG.12

CORRECTION COEFFICIENT SETTING TABLE

| ESTIMATED MAXIMUM LATERAL ACCELERATION | 0.0~0.2 | 0.2~0.4 | 0.4~0.8 | >0.8 |
|---|---|---|---|---|
| CORRECTION COEFFICIENT | 1.0 | 0.5 | 0.3 | 0.0 |

FIG. 15

CORRECTION COEFFICIENT SETTING MAP

| REQUIRED DECELERATION | 0.0 | 0.1 | 0.2 | >0.2 |
|---|---|---|---|---|
| CORRECTION COEFFICIENT | 1.0 | 0.5 | 0.0 | 0.0 |

FIG. 19

CORRECTION COEFFICIENT SETTING TABLE

| DRIVING MANNER | NORMAL | LOW-DEGREE OF SPORT-ORIENTATION | MEDIUM-DEGREE OF SPORT-ORIENTATION | HIGH-DEGREE OF SPORT-ORIENTATION |
|---|---|---|---|---|
| CORRECTION COEFFICIENT | 1.0 | 0.5 | 0.3 | 0.0 |

FIG. 21

CORRECTION COEFFICIENT SETTING TABLE

| \| LATERAL ACCELERATION \| | 0.0~0.2 | 0.2~0.4 | 0.4~0.8 | >0.8 |
|---|---|---|---|---|
| CORRECTION COEFFICIENT | 1.0 | 0.5 | 0.3 | 0.5 |

FIG. 22

CORRECTION COEFFICIENT RECOVERY
SWEEP RATE

| ACCELERATOR PEDAL OPERATION AMOUNT % | 0.0 | 20 | 50 | 100 |
|---|---|---|---|---|
| SWEEP RATE 1/s | 1.0 | 0.5 | 0.3 | 0.0 |

DRIVE POWER CONTROL APPARATUS AND METHOD FOR VEHICLE

BACKGROUND OF THE INVENTION

1. Field of the Invention

The invention relates to a drive power control apparatus and method for a vehicle. More specifically, the invention relates to a drive power control apparatus and method for a vehicle, which adjusts the drive power for driving the vehicle to compensate for an external factor-related parameter that affects the running state of the vehicle.

2. Description on the Related Art

Japanese Patent Application Publication No. JP-2000-27682 (JP-A-2000-27682) describes the technology for controlling the drive power for driving a vehicle in accordance with a road gradient of an uphill slope. According to the technology, there are provided means for detecting the accelerator pedal operation amount; means for setting the usually-used target throttle valve opening amount to the target throttle valve opening amount that is used on a flat road in accordance with the detected accelerator pedal operation amount; means for detecting the weight gradient resistance; means for setting the gradient-compensation target throttle valve opening amount to the target throttle valve opening amount at which the gradient-compensation target drive power is generated, which is obtained by adding the drive power adjustment amount at the weight gradient resistance less than 100% that corresponds to the detected weight gradient resistance to the drive power at the usually-used target throttle valve opening amount; and means for achieving the gradient-compensation target throttle valve opening amount.

Japanese Patent Application Publication No. JP-09-42002 (JP-A-09-42002) describes a drive power control apparatus for a vehicle that sets a predetermined control function to the throttle valve opening amount with respect to the accelerator pedal operation amount, and that includes an electronically-controlled throttle valve that controls the throttle valve opening amount when the accelerator pedal is operated based on the control function. The drive power control apparatus for a vehicle includes road-surface condition detection means for detecting the condition of road-surface of a to-be-taken road, which is a part of the road on which the vehicle is currently traveling and which is apart from the current position of the vehicle by a predetermined distance; and throttle valve opening amount calculation means for calculating the throttle valve opening amount with respect to the accelerator pedal operation amount by correcting the control function to the control function having the characteristics appropriate for the road-surface condition of the to-be-taken road based on the information detected by the road-surface condition detection means.

Japanese Patent Application Publication No. JP-2003-170759 (JP-A-2003-170759) describes a drive power control apparatus for a vehicle that controls the drive power for driving the vehicle so that the target acceleration or the target vehicle speed for achieving the target acceleration corresponding the operating state of the vehicle is achieved. With the drive power control apparatus for a vehicle, the target acceleration is calculated based on the accelerator pedal depression amount, the target vehicle speed is calculated based on the target acceleration, and the drive power is controlled so that the vehicle speed matches the target vehicle speed.

Japanese Patent Application Publication No. 2004-156467 (JP-A-2004-156467) describes an apparatus that controls the drive power for driving a vehicle so that the target acceleration or the target vehicle speed for achieving the target acceleration corresponding to the operating state of the vehicle is achieved. With the control apparatus, the target acceleration is calculated based on the accelerator pedal depression amount, the target vehicle speed is calculated based on the target acceleration, and the drive power is controlled so that the vehicle speed matches the target vehicle speed. When the accelerator pedal depression amount is 0, as the deviation of the actual vehicle speed from the target vehicle speed increases, the feedback gain used in the drive power control decreases.

Japanese Patent Application Publication No. 2004-204832 (JP-A-2004-204832) describes a drive power control apparatus for a vehicle that controls the drive power for driving a vehicle so that the target acceleration or the target vehicle speed for achieving the target acceleration corresponding to the operating state of the vehicle is achieved. With the control apparatus, the target acceleration is calculated based on the accelerator pedal depression amount, the target vehicle speed is calculated based on the target acceleration, and the drive power is controlled so that the vehicle speed matches the target vehicle speed. The corrected target vehicle speed is calculated by correcting the target vehicle speed by the target vehicle speed offset amount corresponding to the speed at which the accelerator pedal is operated, and the drive power is controlled so that the vehicle speed matches the corrected target vehicle speed instead of the target vehicle speed, whereby a delay in response of the actual vehicle speed to a change in the target vehicle speed in accordance with operation of the accelerator pedal is compensated for.

There is a drive power control apparatus for a vehicle that controls the drive power for driving the vehicle to compensate for an external factor-related parameter that affects the running state of the vehicle. When such a drive power control apparatus for a vehicle controls the drive power, the driver may feel a sense of discomfort in some running environments in which the vehicle is running.

SUMMARY OF THE INVENTION

The invention provides a drive power control apparatus and method for a vehicle that adjusts the drive power for driving a vehicle to compensate for an external factor-related parameter that affects the running state of the vehicle while suppressing a sense of discomfort felt by the driver.

An aspect of the invention relates to a drive power control apparatus for a vehicle including a controller that adjusts the drive power for driving a vehicle to compensate for an external factor-related parameter that affects the running state of the vehicle. When the vehicle enters a region where an acceleration of the vehicle needs to be changed based on the running environment or when the vehicle is traveling in the region in which the acceleration of the vehicle needs to be changed based on the running environment, the controller makes the amount by which the drive power is adjusted less than the amount by which the drive power is adjusted when the vehicle is traveling in a region other than the region in which the acceleration of the vehicle needs to be changed based on the running environment.

In the aspect of the invention described above, the external factor-related parameter may include at least one of a road gradient, a cornering resistance, a vehicle weight, an altitude of a region in which the vehicle travels, a road-surface resistance, a variation in performance of an engine of the vehicle, and a variation in a slide resistance and an oil resistance that interfere with a rotation of a transmission of the vehicle.

In the aspect of the invention described above, the region in which the acceleration of the vehicle needs to be changed based on the running environment may be a curve.

In the aspect of the invention described above, the controller may determine whether the vehicle is going round the curve based on at least one of a lateral acceleration applied to the vehicle, a manner in which the vehicle is steered, and rotational speeds of right and left wheels of the vehicle.

In the aspect of the invention described above, the controller may determine a decrease amount in the amount by which the drive power is adjusted when the vehicle is going round the curve based on the lateral acceleration applied to the vehicle.

In the aspect of the invention described above, the controller may set a corrected external factor-related parameter to a value obtained by subtracting a cornering resistance of the vehicle from the external factor-related parameter, and may decrease the amount by which the drive power is adjusted when the vehicle is going round the curve.

In the aspect of the invention described above, the controller may determine whether the vehicle will enter the curve based on at least one of the map information stored in a vehicle compartment of the vehicle, and the information provided from an outside of the vehicle.

In the aspect of the invention described above, before the vehicle enters the curve, the controller may estimate the lateral acceleration that will be applied to the vehicle if the vehicle goes round the curve, and may set the decrease amount in the amount by which the drive power is adjusted based on the estimated lateral acceleration.

In the aspect of the invention described above, the controller may set the decrease amount in the amount by which the drive power is adjusted when the vehicle enters the region in which the acceleration of the vehicle needs to be changed based on the running environment, based on a deceleration required to travel in the region in which the acceleration of the vehicle needs to be changed based on the running environment.

In the aspect of the invention described above, the controller may determine the decrease amount in the amount by which the drive power is adjusted when the vehicle enters the region in which the acceleration of the vehicle needs to be changed based on the running environment, based on the driving manner of a driver of the vehicle.

In the aspect of the invention described above, the controller may execute control so that the drive power for driving the vehicle when the vehicle is traveling on a road in which there are successive curves is less than the drive power for driving the vehicle when a road on which the vehicle is traveling is not a road in which there are successive curves.

In the aspect of the invention described above, the controller may execute control so that a gain of the drive power for driving the vehicle, which is the amount by which the drive power is adjusted, when the vehicle is traveling on the road in which there are successive curves is less than the gain of the drive power when the road on which the vehicle is traveling is not a road in which there are successive curves.

In the aspect of the invention described above, in the case where the vehicle is traveling on the road in which there are successive curves, recovery of control of the drive power for driving the vehicle to normal-time control may be retarded as compared with the case where the road on which the vehicle is traveling is not a road in which there are successive curves.

In the aspect of the invention described above, the controller may determine whether the vehicle is traveling on the road in which there are successive curves based on the map information.

In the aspect of the invention described above, the controller may determine whether the vehicle is traveling on the road in which there are successive curves based on at least one of whether a curve having a curvature equal to or greater than a predetermined value is present within a region having a predetermined length and the number of curves, each of which has a curvature equal to or greater than the predetermined value, present within the region having the predetermined length.

According to the first aspect of the invention, it is possible to adjust the drive power to compensate for an external factor-related parameter that affects the running state of the vehicle while suppressing a sense of discomfort felt by the driver.

BRIEF DESCRIPTION ON THE DRAWINGS

The foregoing and further objects, features and advantages of the invention will become apparent from the following description on example embodiments with reference to the accompanying drawings, wherein the same or corresponding portions will be denoted by the same reference numerals and wherein:

FIG. 5 is the correction coefficient setting map, which is used in the drive power control apparatus for a vehicle according to the first embodiment of the invention;

FIG. 8 is the map showing the cornering resistance map, which is used in the drive power control apparatus for a vehicle according to the second embodiment of the invention;

FIG. 12 is the correction coefficient setting table, which is used in the drive power control apparatus for a vehicle according to the third embodiment of the invention;

FIG. 15 is the correction coefficient setting table, which is used in the drive power control apparatus for a vehicle according to the first modified example of the third embodiment of the invention;

FIG. 19 is the correction coefficient setting table, which is used in the drive power control apparatus for a vehicle according to the fourth modified example of the third embodiment of the invention;

FIG. 21 is the correction coefficient setting map, which is used in the drive power control apparatus for a vehicle according to the fourth embodiment of the invention;

FIG. 22 is the table for describing the correction coefficient recovery sweep rate which is used in the drive power control apparatus for a vehicle according to the fourth embodiment of the invention;

Figure 33:
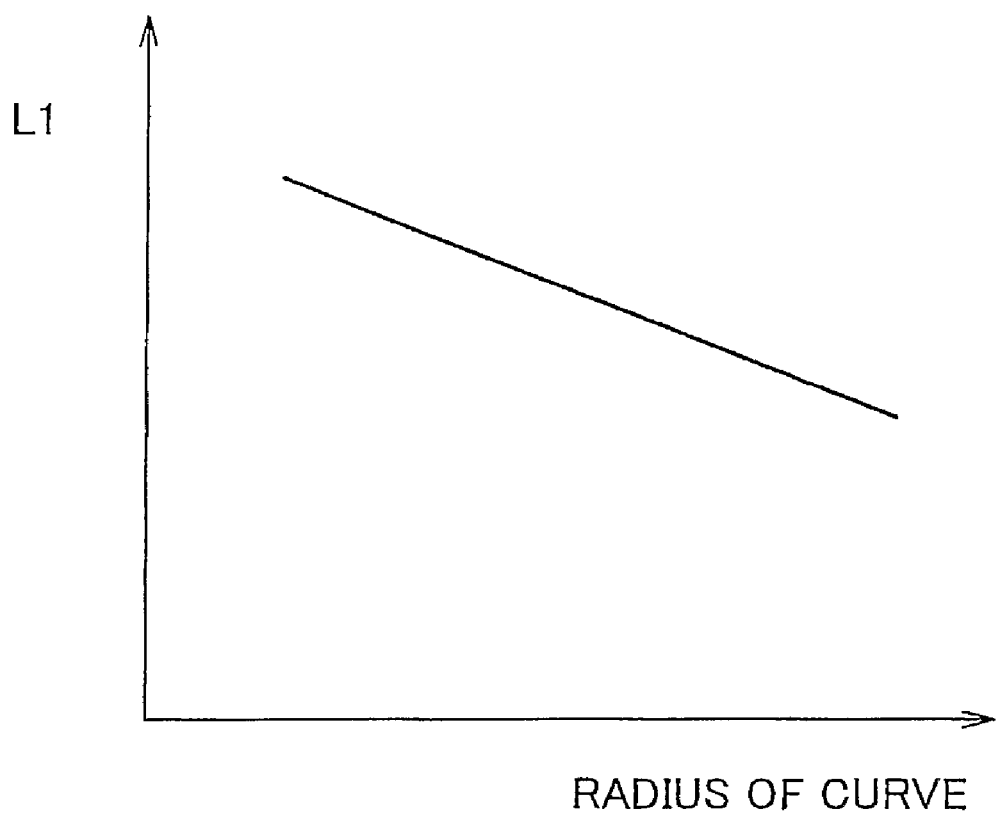
Figure 34:
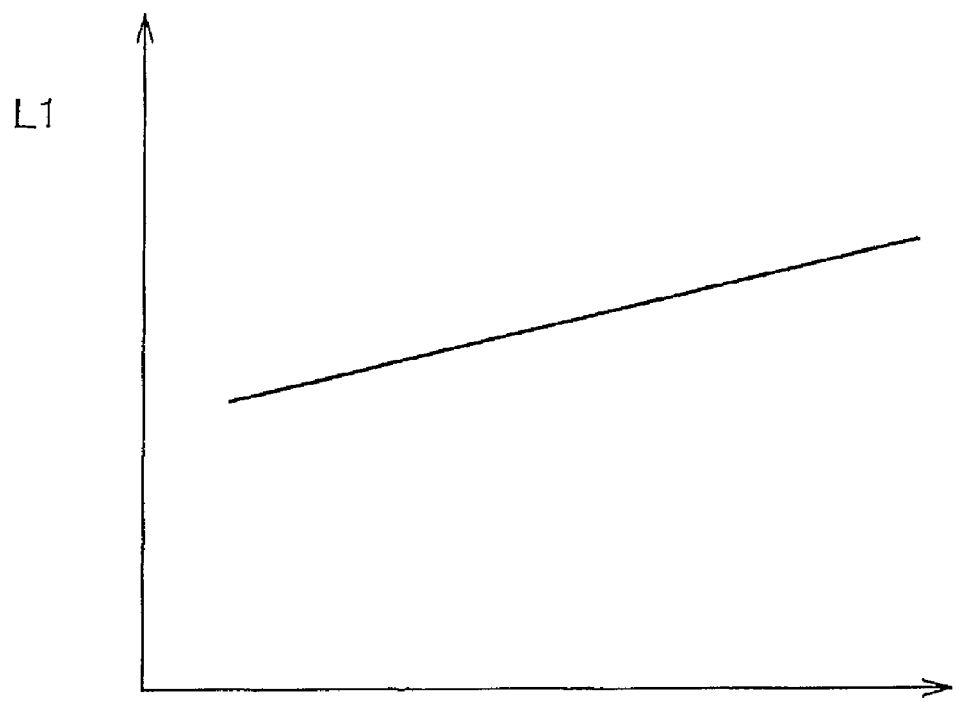

FIG. 33 is the graph showing the relationship between the radius and the predetermined value, which is used in the drive power control apparatus for a vehicle according to the first modified example of the sixth embodiment of the invention; and FIG. 34 is the graph showing the relationship between the driving manner and the predetermined value, which is used in the drive power control apparatus for a vehicle according to the first modified example of the sixth embodiment of the invention.

DETAILED DESCRIPTION ON THE EXAMPLE EMBODIMENTS

Hereafter, a drive power control apparatus and method for a vehicle according to each example embodiment of the invention will be described with reference to the accompanying drawings.

A drive power control apparatus and method for a vehicle according to a first embodiment of the invention will be described with reference to FIGS. 1 to 5.

First, the inconvenience that will be minimized by the drive power control apparatus and method according to the first embodiment of the invention will be described below. For example, when a vehicle is going round a curve in an uphill slope and the control for compensating for the resistance to the road gradient (hereinafter, referred to as the "road gradient resistance") is executed, even if the driver depresses an accelerator pedal only slightly, the vehicle accelerates by a great amount with respect to the accelerator pedal depression amount. On an uphill slope, the driver expects that the vehicle will accelerate by an amount less than that on a flat road with the same accelerator pedal depression amount. However, if the opening amount of an electronically-controlled throttle valve is adjusted by an amount required to compensate for the road gradient resistance, the vehicle accelerates by an amount greater than the driver would expect. Accordingly, if the driver operates the accelerator pedal somewhat roughly while the vehicle is going round a curve, the vehicle may behave in a manner which is not desired by the driver, for example, the vehicle may undergo understeer. As a result, the drivability may be reduced. To minimize such inconvenience, the amount, by which the drive power is adjusted (hereinafter, referred to as a "drive power adjustment amount" where appropriate) to compensate for external factor-related parameters such as a road gradient resistance, is decreased when the vehicle is going round a curve, according to the first embodiment of the invention. The first embodiment of the invention will be described below in detail.

According to the first embodiment of the invention, there are provided means for detecting or estimating external factor-related parameters such as a road gradient; an accelerator pedal operation amount sensor; means capable of changing the characteristics of the drive power for driving the vehicle, for example, an electronically-controlled throttle valve, and an automatic transmission such as a stepped transmission, a continuously variable transmission, a HV, or a MMT (Multi-mode Transmission); and means for detecting or estimating the lateral acceleration applied to the vehicle.

Figure 2:
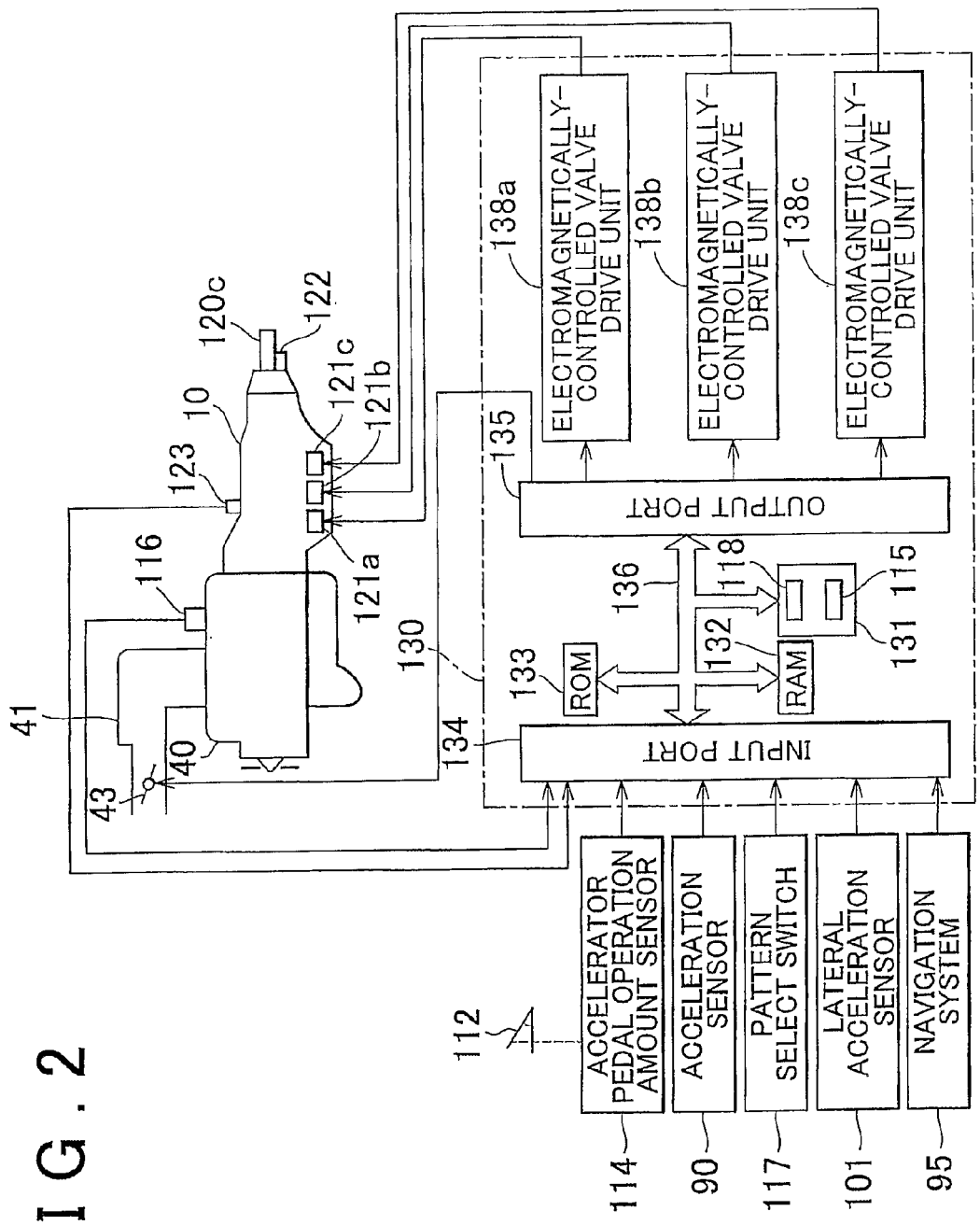
FIG. 2 is the view schematically showing the structure of the drive power control apparatus for a vehicle according to the first embodiment of the invention.

FIG. 2 shows an automatic transmission 10, and an engine 40. The hydraulic pressures in the automatic transmission 10 are controlled by permitting/blocking passage of electric currents through electromagnetically-controlled valves 121a, 121b, and 121c, whereby one of six gears of the automatic transmission 10 is selected. FIG. 2 shows an example in which the three electromagnetically-controlled valves 121a, 121b and 121c are employed. However, the number of electromagnetically-controlled valves is not limited to three. The electromagnetically-controlled valves 121a, 121b and 121c are driven under control of signals from a control circuit 130.

An accelerator pedal operation amount sensor 114 detects the operation amount of an accelerator pedal 112. An engine rotational speed sensor 116 detects the rotational speed of the engine 40. A vehicle speed sensor 122 detects the rotational speed of an output shaft 120c of the automatic transmission 10, which is proportional to the vehicle speed. A shift position sensor 123 detects the shift position. A pattern select switch 117 is used to instruct the shift pattern. An acceleration sensor 90 detects the acceleration (deceleration) of the vehicle. A lateral acceleration sensor 101 detects the lateral acceleration applied to the vehicle.

The basic function of a navigation system 95 is to guide the vehicle to a selected destination. The navigation system 95 includes a processor; an information storage medium that stores the information required to drive the vehicle (e.g. maps, straight roads, curves, uphill slopes, downhill slopes, and highways); a first information detection unit that detects the current position of the vehicle and the road condition by self-navigation, and that includes a geomagnetic sensor, a gyro-compass, and a steering sensor; a second information detection unit that detects the current position of the vehicle, the road condition, etc. by radio-navigation, and that includes a GPS (Global Positioning System) antenna, a GPS (Global Positioning System) receiver, etc.

A road gradient measurement/estimation unit 118 may be included in a CPU 131. The road gradient measurement/estimation unit 118 may measure or estimate the road gradient based on the acceleration detected by the acceleration sensor 90. Alternatively, the road gradient measurement/estimation unit 118 may calculate the road gradient by comparing the acceleration actually detected by the acceleration sensor 90 with the acceleration on a flat road, which is stored in the ROM 133 in advance.

An external factor-related parameter detection/estimation unit 115 detects or estimates an external factor-related parameter that affects the running state of the vehicle. The nominal vehicle speed and the nominal acceleration are set to the target vehicle speed (the theoretical value of the vehicle speed) and the target acceleration (the target value of the acceleration) that are estimated to be achieved under the condition that, for example, the accelerator pedal operation amount and the vehicle speed are equal to predetermined values, the vehicle is traveling on a flat road, and the current number of occupants matches the seating capacity of the vehicle. The external factor-related parameters include all the elements that may affect the running state of the vehicle when the vehicle is not actually running at the nominal vehicle speed or is not actually accelerating at the nominal acceleration. The external factor-related parameters include all the elements that may affect the drive power for driving the vehicle, for example, the road gradient, the cornering resistance, the vehicle weight, the altitude of the region in which the vehicle travels, the surface roughness of a road (the road-surface resistance), the variation in the engine performance, and the variation in the slide resistance, the oil resistance, etc. that interfere with the rotation of a transmission.

Figure 7:
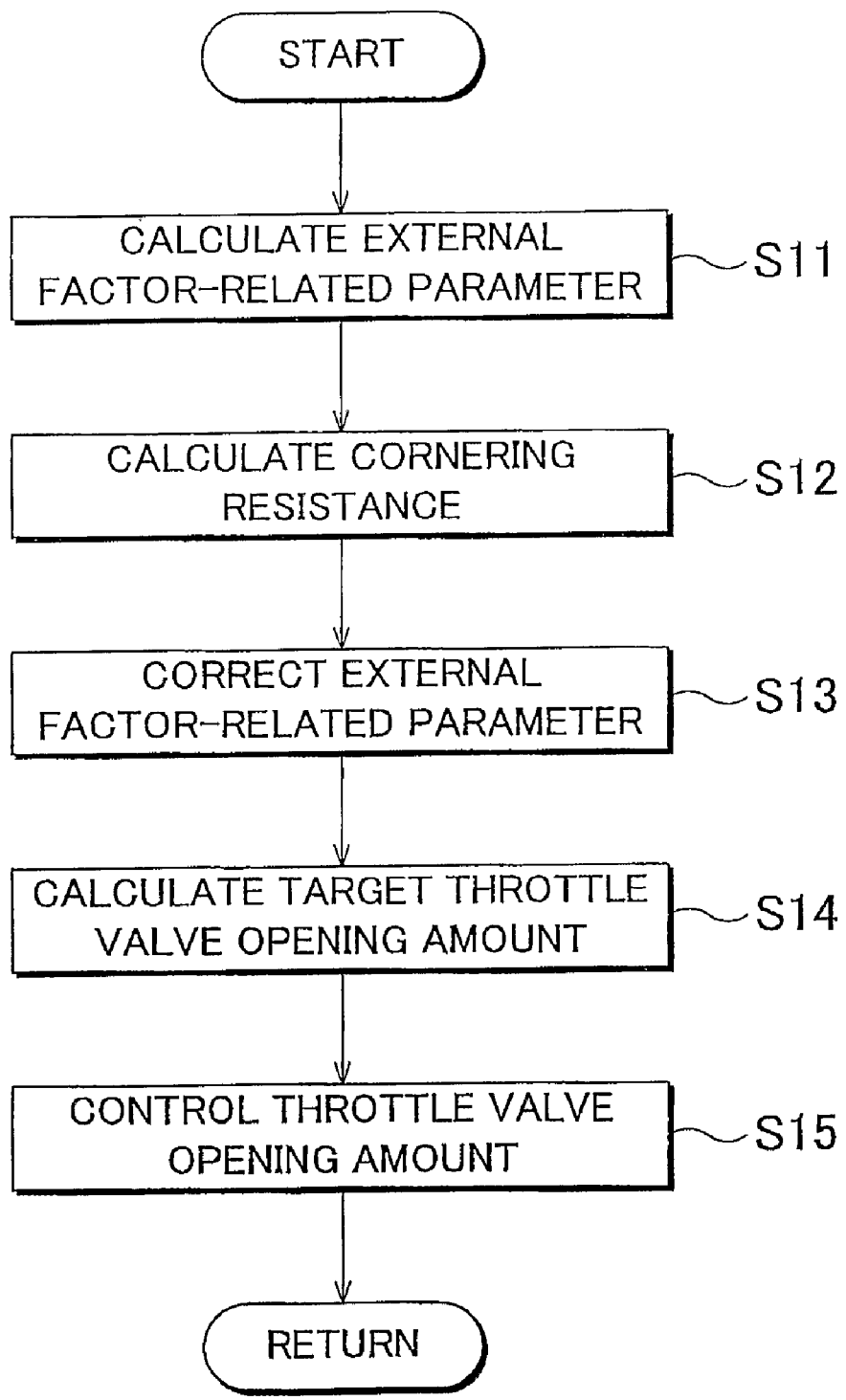
FIG. 7 is the flowchart showing the routine executed by the drive power control apparatus for a vehicle according to the second embodiment of the invention.

The external factor-related parameter detection/estimation unit 115 may detect or estimate the external factor-related parameter based on the deviation of the actual drive power for driving the vehicle from the reference drive power, which is the theoretical value calculated under the condition that, for example, the accelerator pedal operation amount and the vehicle speed are equal to the predetermined values, the number of occupants matches the seating capacity of the vehicle, and the vehicle is traveling on a flat road (refer to step S11 in FIG. 7, described later). The reference drive power will be described later in step S2 in FIG. 1. The external factor-related parameter may be calculated based on the deviation of the actual acceleration from the acceleration that is achieved when the vehicle is traveling on a flat road and that is determined based on the engine torque (the reference drive power calculated in step S2 in FIG. 1/vehicle weight).

The control circuit 130 receives the signals indicating the values detected by the accelerator pedal operation amount sensor 114, the engine rotational speed sensor 116, the vehicle speed sensor 122, the shift position sensor 123, and the acceleration sensor 90, the signal indicating the shift pattern from the pattern select switch 117, and the signal indicating the lateral acceleration detected by the lateral acceleration sensor 101.

The control circuit 130 is formed of a known microcomputer. The control circuit 130 includes the CPU 131, RAM 132, the ROM 133, an input port 134, an output port 135, and a common bus 136. The control unit 130 receives the signals from the sensors 114, 116, 122, 123, and 90, the signal from the pattern select switch 117, the signal from the lateral acceleration sensor 101, and the signal from the navigation system 95 through the input port 134. Electromagnetically-controlled valve drive units 138a, 138b, and 138c are connected to the output port 135.

Figure 1:
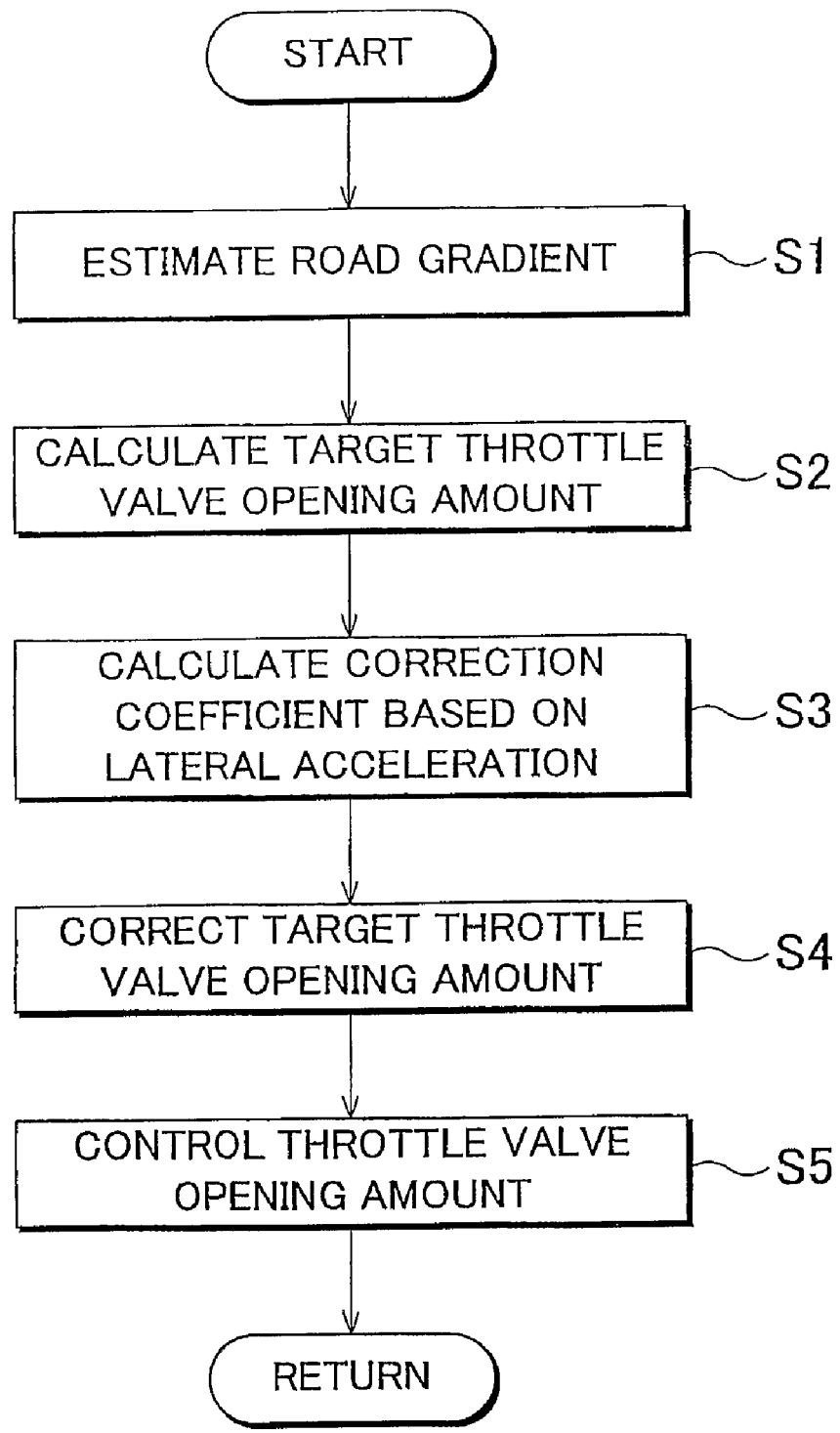
FIG. 1 is the flowchart showing the routine executed by a drive power control apparatus for a vehicle according to a first embodiment of the invention.

The ROM 133 stores the routine (the control steps) shown in the flowchart in FIG. 1 in advance. In addition, the ROM 133 stores the shift map used to change gears of the automatic transmission 10, and the routine (not shown) of the shift control. The control circuit 130 changes gears of the automatic transmission 10 based on the various control signals received.

The routine according to the first embodiment of the invention will be described with reference to FIGS. 1 and 2. The control circuit 130 mainly executes the routine described below.

When the vehicle is going round a curve in an uphill slope and the drive power is adjusted to compensate for the road gradient resistance, if the driver operates the accelerator pedal somewhat roughly, the vehicle may behave in a manner which is not desired by the driver. As a result, the drivability may be reduced. However, such inconvenience is minimized according to the first embodiment of the invention. According to the first embodiment of the invention, when the vehicle is going round a curve, the amount, by which the drive power is adjusted to compensate for the external factor-related parameters such as the road gradient, is decreased, whereby the inconvenience described above is minimized. The routine according to the first embodiment of the invention will be described below in detail.

In step S1, the road gradient measurement/estimation unit 118 estimates the gradient of the road on which the vehicle is currently traveling. The road gradient measurement/estimation unit 118 may calculate (estimate) the road gradient based on the deviation of the actual acceleration of the vehicle from the acceleration that is achieved when the vehicle is traveling on a flat road at the current engine torque. Alternatively, the road gradient measurement/estimation unit 118 may estimate the road gradient based on the information on the current vehicle position, which is obtained by the navigation system 95 and the map information stored in the navigation system 95. In the first embodiment of the invention, the description will be provided on the assumption that the road gradient of an uphill slope is estimated. After step S1 is completed, step S2 is executed.

In step S2, the target throttle valve opening amount is calculated. The target throttle valve opening amount is calculated based on the road gradient estimated in step S1, according to the following procedures 1) to 6).

Figure 3:
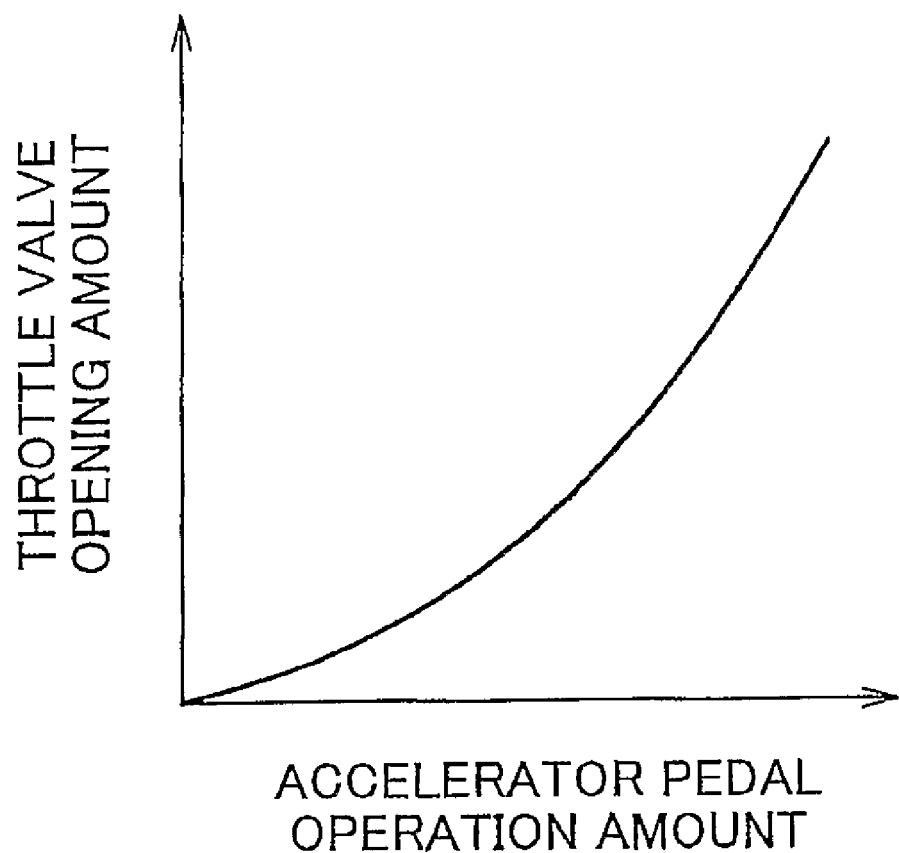
FIG. 3 is the graph showing the relationship between the accelerator pedal operation amount and the throttle valve opening amount, which is used in the drive power control apparatus for a vehicle according to the first embodiment of the invention.
Figure 4:
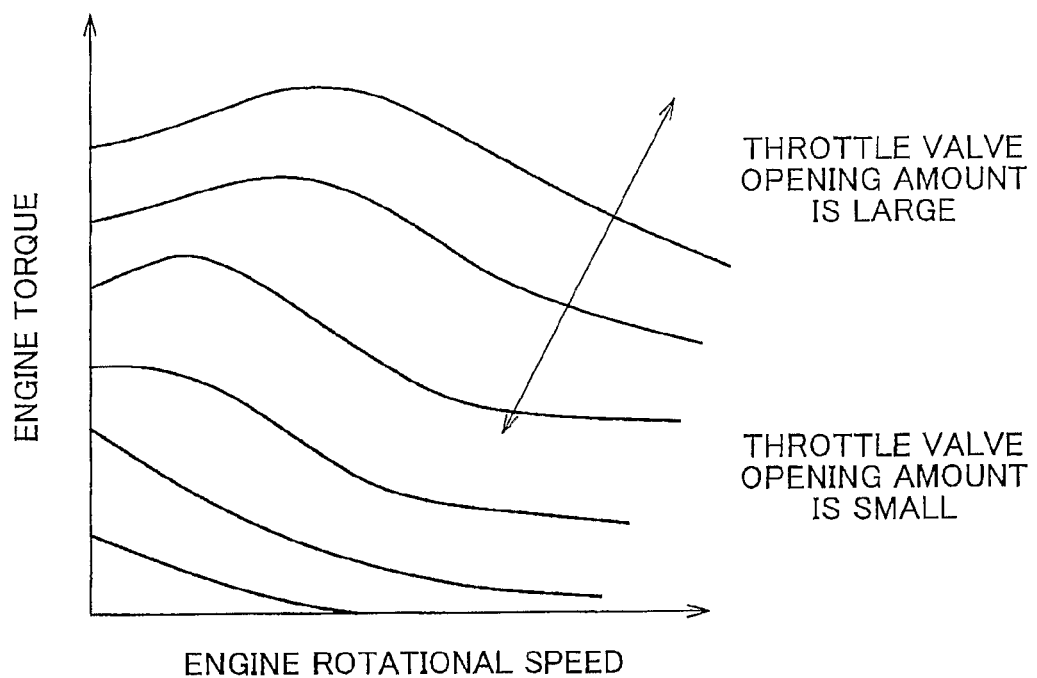
FIG. 4 is the graph showing the relationship among the engine rotational speed, the engine torque and the throttle valve opening amount, which is used in the drive power control apparatus for a vehicle according to the first embodiment of the invention.

1) The reference throttle valve opening amount is calculated based on the current accelerator pedal operation amount detected by the accelerator pedal operation amount sensor 114, using the map showing the relationship between the accelerator pedal operation amount and the throttle valve opening amount shown in FIG. 3. 2) The reference engine torque is calculated based on the reference throttle valve opening amount calculated in the procedure 1), using the map showing the relationship among the engine rotational speed, the engine torque, and the throttle valve opening amount shown in FIG. 4. 3) The reference drive power is calculated by the following equation 1.

$$\text{Reference drive power} = \text{reference engine torque} \times \text{torque ratio of torque converter} \times \text{gear ratio} \times \text{differential ratio} \times \text{efficiency of automatic transmission} \times \text{efficiency of differential gear unit}/\text{tire radius} \quad \text{<Equation 1>}$$

4) The target drive power is calculated by the following equation 2

$$\text{Target drive power} = \text{reference drive power} + \text{road gradient} \times \text{vehicle weight} \times \text{predetermined value} \quad \text{<Equation 2>}$$

The predetermined value in the equation may be a fixed value (e.g. 1.0), or may be variable in accordance with the road gradient (e.g. the predetermined value is 0 when the road gradient is less than 0, and is 1.0 when the road gradient is equal to or greater than 0).

5) The target engine torque is calculated by the following equation 3.

$$\text{Target engine torque} = \text{target drive power} \times \text{tire radius}/\text{torque ratio of torque converter}/\text{gear ratio}/\text{differential ratio}/\text{efficiency of automatic transmission}/\text{efficiency of differential gear unit} \quad \text{<Equation 3>}$$

6) The target throttle valve opening amount, at which the target drive power is obtained, is calculated based on the target engine torque and the current engine rotational speed, using the engine torque characteristic map (FIG. 4). After step S2 is completed, step S3 is executed.

In step S3, the correction coefficient is calculated based on the lateral acceleration detected by the lateral acceleration sensor 101. The correction coefficient may be calculated based on the absolute value of the lateral acceleration using, for example, the correction coefficient setting map shown in FIG. 5. When the absolute value of the lateral acceleration is 0, the vehicle is not going round a curve. Accordingly, the correction coefficient is set to 1.0. As the absolute value of the lateral acceleration increases, the correction coefficient decreases. The minimum value of the correction coefficient is 0. After step S3 is completed, step S4 is executed.

In step S4, the throttle valve opening amount is corrected (the corrected target throttle valve opening amount is calculated) by the following equation 4.

$$\text{Corrected target throttle valve opening amount} = \text{reference throttle valve opening amount} + (\text{target throttle valve opening amount} - \text{reference throttle valve opening amount}) \times \text{correction coefficient} \quad \text{<Equation 4>}$$

According to the following equation 4, when the correction coefficient is 1.0, the corrected target throttle valve opening amount is equal to the target throttle valve opening amount (corrected target throttle valve opening amount=target throttle valve opening amount). As the correction coefficient decreases, the drive power adjustment amount decreases. When the correction coefficient is 0, the drive power adjustment amount is also 0. After step S4 is completed, step S5 is executed.

In step S5, the throttle valve opening amount control is executed. The throttle valve opening amount control is executed so that the opening amount of an electronically-controlled throttle valve 43 is equal to the corrected target throttle valve opening amount calculated in step S4. Thus, the drive power is adjusted by an amount appropriate for the running state of the vehicle which is going round a curve.

Next, the effects of the first embodiment of the invention will be described.

When the control for optimizing the characteristics of the drive power by increasing the drive power by an amount required to compensate for the running resistance due to the external factors (including the road gradient) is executed, substantially the same drive power is obtained with an accelerator pedal operation amount less than that when the control is not executed. Accordingly, when the control is executed while the vehicle is going round a curve, the following inconvenience is more likely to occur than when the control is not executed. For example, if the accelerator pedal is operated somewhat roughly, the vehicle may undergo understeer.

According to the first embodiment of the invention, it is determined or estimated whether the vehicle is going round a curve by detecting or estimating the lateral acceleration applied to the vehicle. If it is determined that the vehicle is going round a curve, the amount, by which the drive power is increased to compensate for the running resistance, is made less than that when the vehicle is not going round a curve. In this case, as the lateral acceleration increases, the amount, by which the drive power is increased to compensate for the running resistance, may be decreased by a greater amount. According to the first embodiment of the invention, even if the accelerator pedal is operated somewhat roughly while the vehicle is going round a curve, the vehicle continues running without problems in its behavior. As a result, the drivability improves.

A first modified example of the first embodiment of the invention will be described below. According to the first embodiment of the invention, it is determined or estimated whether the vehicle is going round a curve based on the lateral acceleration applied to the vehicle. In contrast, according to the first modified example, the parameter used to determine or estimate whether the vehicle is going round a curve is not limited to the lateral acceleration applied to the vehicle. For example, it may be determined or estimated whether the vehicle is going round a curve based, for example, on the steering angle, the difference in the wheel speed between the right and left wheels, or the yaw rate of the vehicle.

A second modified example of the first embodiment of the invention will be described below. According to the first embodiment of the invention, the correction coefficient is set to one of the values at three levels based on the lateral acceleration applied to the vehicle, as shown in FIG. 5. In contrast, according to the second modified example, the correction coefficient may be set to one of the values at two, four, or more levels. For example, when the absolute value of the lateral acceleration is equal to or greater than 0.2 G, the correction coefficient may be set to 0.3. On the other hand, when the absolute value of the lateral acceleration is less than 0.2 G, the correction coefficient may be set to 1.0.

A third modified example of the first embodiment of the invention will be described below. In the first embodiment of the invention, the description is provided concerning the case in which the drive power is adjusted to compensate for the road gradient (the external factor-related parameter is the road gradient). In contrast, according to the third modified example, the external factor-related parameter is not limited to the road gradient. All the external factor-related parameters detected by the external factor-related parameter detection/estimation unit 115 may be used in the control according to the third modified example. The external factor-related parameters include, for example, the cornering resistance, the vehicle weight, the altitude of the region in which the vehicle travels, the roughness of the road surface (the road resistance), the variation in the engine performance, and the variation in the slide resistance, the oil resistance, etc. that interfere with the rotation of a transmission. When the vehicle is going round a curve, the amount, by which the drive power is adjusted to compensate for these external factor-related parameters, is made less than that when the vehicle is not going round a curve.

A fourth modified example of the first embodiment of the invention will be described below. In the first embodiment of the invention, the description is provided concerning the case where the drive power is adjusted when the vehicle is traveling on an uphill slope (when the running resistance increases due to the external factor-related parameter). In contrast, according to the fourth modified example, the drive power is adjusted (the drive power that will be generated is decreased by an amount required to compensate for the road gradient) when the vehicle is traveling on a downhill slope (when the running resistance decreases due to the external factor-related parameter). When the vehicle is going round a curve in a downhill slope, the drive power adjustment amount is made less than that when the vehicle is not going round a curve. The case where the running resistance decreases due to the external factor-related parameter is not limited to the case where the vehicle is traveling on a downhill slope.

A fifth modified example of the first embodiment of the invention will be described below. According to the first embodiment of the invention, the electronically-controlled throttle valve 43 is used as the means for adjusting the drive power. In contrast, according to the fifth modified example, the means for adjusting the drive power is not limited to the electronically-controlled throttle valve 43. Any means that can variably set the relationship between the accelerator pedal operation amount and the drive power or the torque (the engine torque or the torque of the output shaft) may be used. For example, an automatic transmission such as the stepped transmission 10, a continuously variable transmission, a HV, or a MMT (multimode transmission), or power running operation of a motor generator (not shown) may be used as the means for adjusting the drive power. The fifth modified example may also be applied to the following embodiments of the invention.

Figure 6:
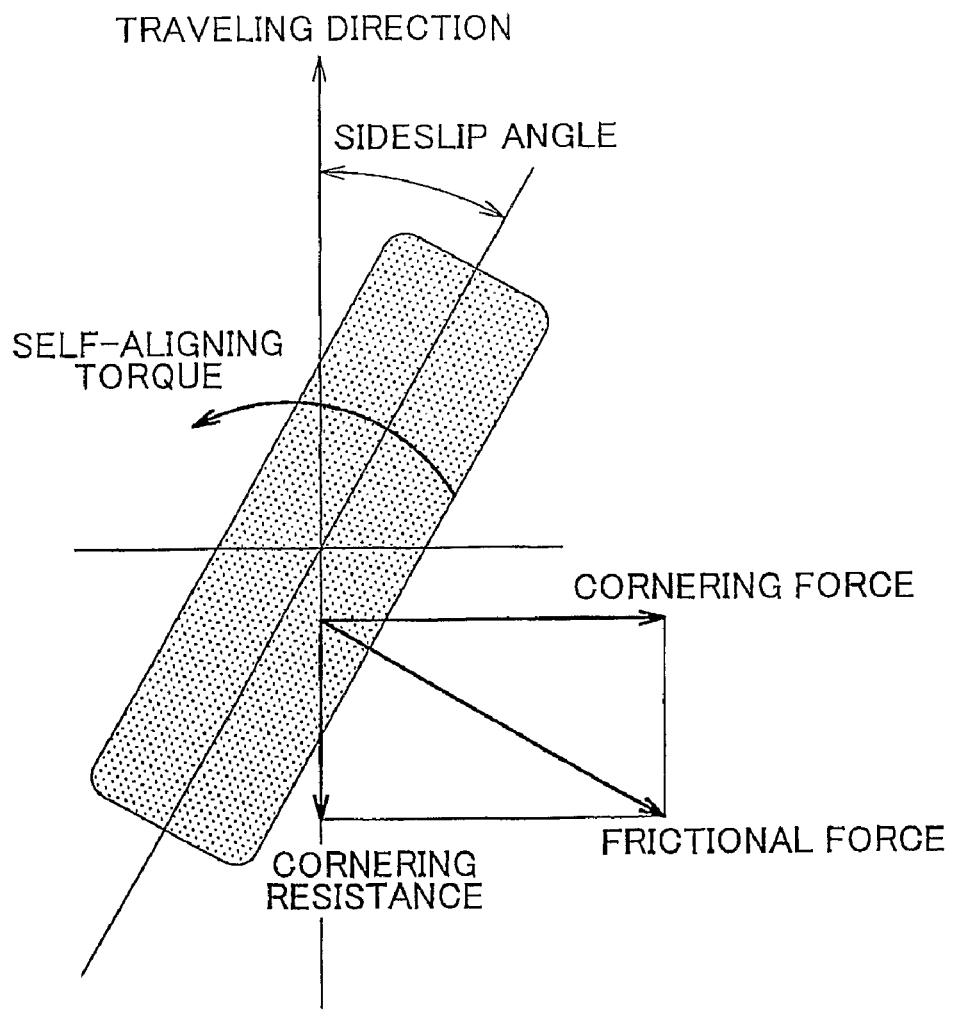
FIG. 6 is the view for describing the forces that are applied to a tire while the vehicle is going round a curve, and for describing the control executed by a drive power control apparatus for a vehicle according to a second embodiment of the invention.

Next, a drive power control apparatus and method according to a second embodiment of the invention will be described with reference to FIGS. 6 and 7. The description on the same portions as those in the first embodiment will not be provided below.

The inconvenience that will be minimized by the drive power control apparatus and method according to the second embodiment of the invention is the same as that described in the first embodiment of the invention. When the control for optimizing the characteristics of the drive power by increasing the drive power by an amount required to compensate for an increase in the running resistance due to the external factors (including the road gradient) is executed, if the driver operates the accelerator pedal somewhat roughly while the vehicle is going round a curve, the vehicle may behave in a manner which is not desired by the driver. As a result, the drivability may be reduced. However, such inconvenience is minimized according to the second embodiment of the invention.

According to the second embodiment of the invention, the external factor-related parameter detection/estimation unit 115 measures or estimates the cornering resistance.

In the control for optimizing the characteristics of the drive power by increasing the drive power by an amount required to compensate for an increase in the running resistance due to the external factors (including the road gradient), the cornering resistance (see FIG. 6) that is developed in a tire while the vehicle is turning is regarded as an external factor-related parameter, and the drive power is adjusted to compensate for also the cornering resistance. With such control, when the vehicle is going round a curve, the drive power is adjusted to compensate for also the cornering resistance developed in the tire. Accordingly, if the accelerator pedal is operated somewhat roughly, the inconvenience is more likely to occur, for example, the vehicle is more likely to undergo understeer than when the control (adjustment of the drive power) is not executed.

To minimize such inconvenience, according to the second embodiment of the invention, the cornering resistance is excluded from the external-factor related parameters, and the drive power is adjusted by an amount appropriate to compensate for the external factor-related parameters other than the cornering resistance. Thus, when the vehicle is going round a curve, the amount, by which the drive power is increased, is decreased. As a result, destabilization of the vehicle behavior is suppressed, and reduction in the drivability is suppressed.

The routine according to the second embodiment of the invention will be described with reference to FIG. 7. The control circuit 130 mainly executes the routine.

In step S11, the external factor-related parameter detection/estimation unit 115 calculates the external factor-related parameter. The external factor-related parameter is calculated by the following equation 5.

External factor-related parameter=reference drive power−actual acceleration of vehicle×vehicle weight     <Equation 5>

The reference drive power in the equation 5 is calculated by the equation 1 used in the procedure 3) in step S2 according to the first embodiment of the invention.

In step S12, the external factor-related parameter detection/estimation unit 115 calculates the cornering resistance. The cornering resistance is calculated by the following equation 6.

Cornering resistance=cornering resistance coefficient×vehicle weight     <Equation 6>

In the equation 6, the cornering resistance coefficient is the function of response of the vehicle to the vehicle speed, the curvature of a curve, the suspension geometry, the tire performance, the inflation pressure, and/or the lateral acceleration. The cornering resistance coefficient may be calculated based on the lateral acceleration as shown in the map in FIG. 8, to simplify the procedure.

In step S13, the external factor-related parameter is corrected. The external factor-related parameter is corrected by the following equation 7.

Corrected external factor-related parameter=external factor-related parameter−cornering resistance  <Equation 7>

In step S14, the target throttle valve opening amount is calculated. Because the method for calculating the target throttle valve opening amount is basically the same as that in step S2 in FIG. 1, the description thereof will not be provided below. According to the second embodiment of the invention, the target drive power is calculated in step S14 by the following equation 8 instead of the equation 2 that is used in the procedure 4) in step S2.

Target drive power=reference drive power−corrected external factor-related parameter×predetermined value  <Equation 8>

In step S15, the control is executed so that the throttle valve opening amount is equal to the target throttle valve opening amount calculated in step S14. Step S15 is the same as step S5 in FIG. 1.

According to the second embodiment of the invention, as described in step S13, the corrected external factor-related parameter is set to the value obtained by subtracting the cornering resistance from the external factor-related parameter. Then, the drive power adjustment amount is determined based on the corrected external factor-related parameter. Namely, according to the second embodiment of the invention, the drive power adjustment for compensating for the cornering resistance is not made. Accordingly, the inconvenience such as understeer that may occur when the accelerator pedal is operated somewhat roughly is suppressed. As a result, the drivability improves.

Next, a drive power control apparatus and method for a vehicle according to a third embodiment of the invention will be described with reference to FIGS. 9 to 11. The description on the same portions as those in the first embodiment of the invention will not be provided below.

According to the third embodiment of the invention, means (the navigation system 95) for calculating the curvature of a curve (or the radius R of the curve) that is ahead of the current vehicle position by a predetermined distance is used.

The inconvenience that will be minimized by the drive power control apparatus and method according to the third embodiment of the invention will be described below.

Before the vehicle enters a curve, the driver usually releases the accelerator pedal to decelerate the vehicle. At this time, if the vehicle is traveling on an uphill slope and the control for compensating for the road gradient resistance is executed, less deceleration is achieved than when such control is not executed. On an uphill slope, the driver expects a deceleration greater than that on a flat road by an amount corresponding to the road gradient with the same accelerator pedal release amount. However, because the opening amount of the electronically-controlled throttle valve is adjusted by an amount required to compensate for the road gradient, the vehicle does not decelerate as much as the driver would expect. Accordingly, the driver needs to release the accelerator pedal by a greater amount. As a result, the drivability is reduced.

Especially, if the operation for releasing the accelerator pedal and an increase in the road gradient concurrently occur, the driver feels that "sufficient deceleration will be achieved with a small accelerator pedal release amount, because the road gradient is increasing". However, the drive power is increased by an amount corresponding to the increase in the road gradient. Accordingly, the deceleration hardly increases, and the driver feels a strong sense of discomfort.

In the control for changing the characteristics of the electronically-controlled throttle valve based on the running environment (e.g. the area control), the inconvenience described above may occur. For example, when the vehicle is traveling on a mountain uphill slope (a winding uphill slope), the gain of the throttle valve opening amount is set to a high valve even when the accelerator pedal operation amount is small. Accordingly, before the vehicle enters a curve, the driver needs to release the accelerator pedal by a great amount to achieve the required deceleration. Accordingly the drivability is reduced.

Generally, the driver is not very conscious that the drive power is adjusted to compensate for the road gradient resistance. Therefore, the driver tends to feel that, if he/she releases the accelerator pedal on an uphill slope (it is relatively easy for the driver to visually check that the vehicle is traveling on an uphill slope), the vehicle will decelerate by an amount corresponding to the accelerator pedal release amount. Especially, if the accelerator pedal is released when the road gradient is increasing, a decrease in the drive power due to the accelerator pedal release operation and an increase in the drive power due to an increase in the road gradient concurrently occur. Therefore, although the driver releases the accelerator pedal in order to decelerate the vehicle, sufficient deceleration is not achieved, and the driver feels a strong sense of discomfort.

To minimize such inconvenience, according to the third embodiment of the invention, before the vehicle enters a curve, that is, when the driver needs to decelerate the vehicle, the drive power adjustment amount is changed based on the estimated maximum lateral acceleration or the rate of change in the drive power adjustment amount is limited. When the estimated maximum lateral acceleration is great, the drive power adjustment amount is decreased. Thus, before the vehicle enters a curve, a sufficient deceleration is achieved, and the driver does not feel a sense of discomfort.

According to the third embodiment of the invention, the drive power adjustment amount is determined based on the estimated maximum lateral acceleration. This is because, the estimated maximum lateral acceleration calculated based on the radius R of the curve and the vehicle speed is useful for determining the vehicle speed to which the vehicle should be decelerated before the vehicle enters the curve.

Next, the routine according to the third embodiment of the invention will be described with reference to FIG. 11. The control circuit 130 mainly executes the routine.

Because steps S21 and S22 are the same as steps S1 and S2 in FIG. 1, respectively, the description thereof will not be provided below.

In step S23, it is determined whether there is a curve ahead of the vehicle. Whether there is a curve ahead of the vehicle is determined based, for example, on the map information stored in the navigation system 95 and the information on the vehicle position obtained by GPS. If it is determined that there is a curve ahead of the vehicle, step S24 is executed. On the other hand, if it is determined that there is not a curve ahead of the vehicle, step S28 is executed.

Figure 9:
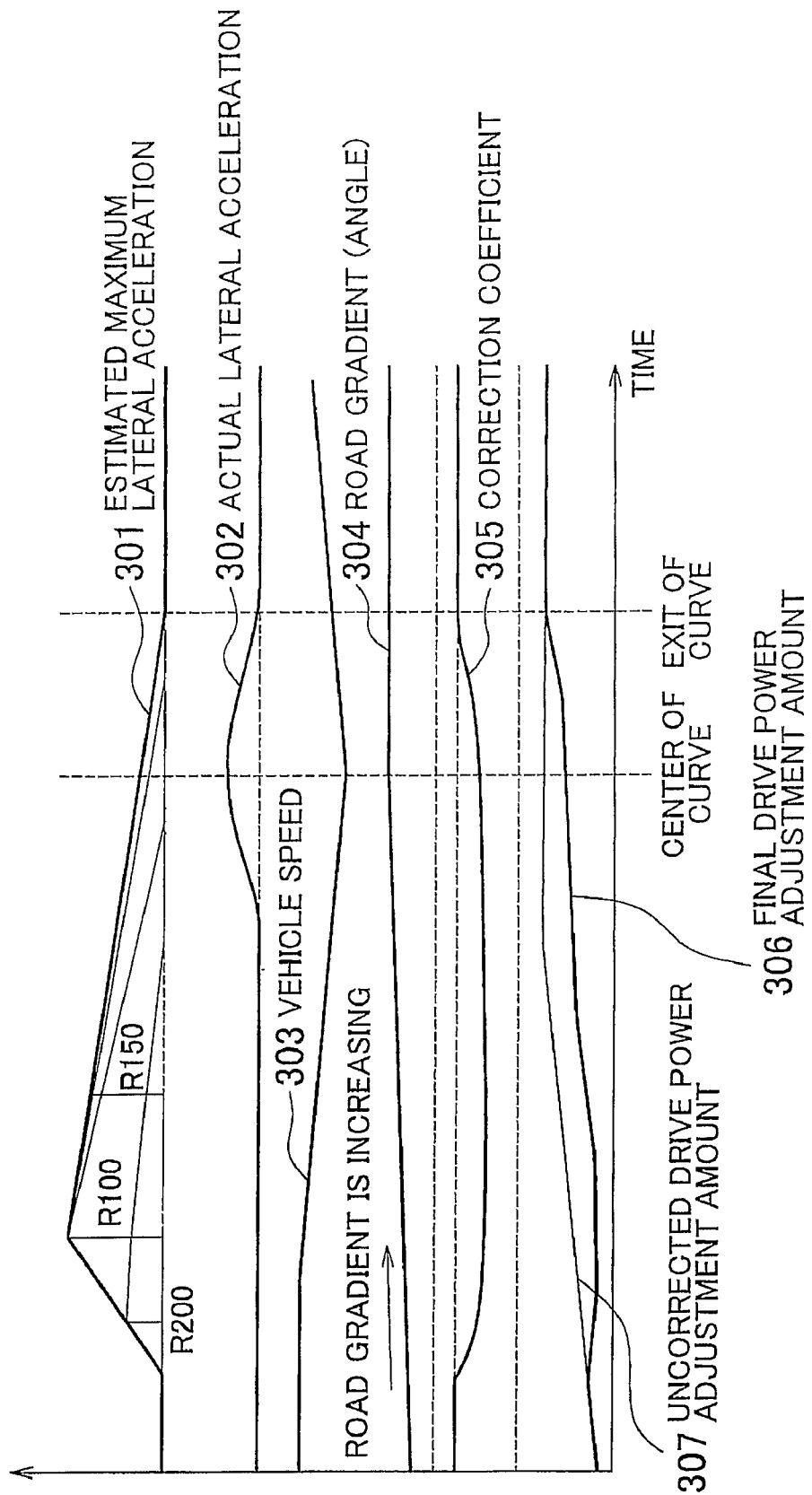
FIG. 9 is the time-chart for describing the operation of a drive power control apparatus for a vehicle according to a third embodiment of the invention.
Figure 10:
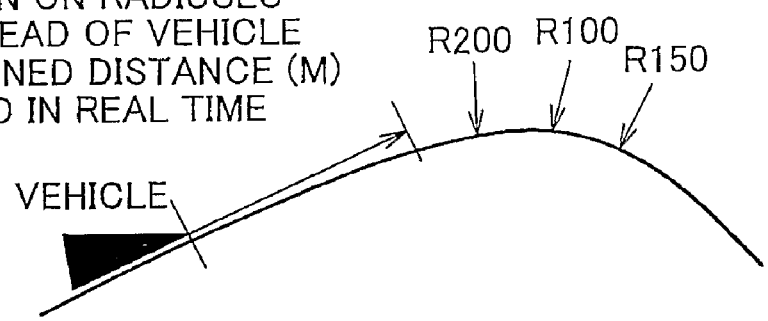
FIG. 10 is the view for describing the situation in which the vehicle control apparatus according to the third embodiment of the invention obtains the information on the curve ahead of the vehicle.
Figure 11:
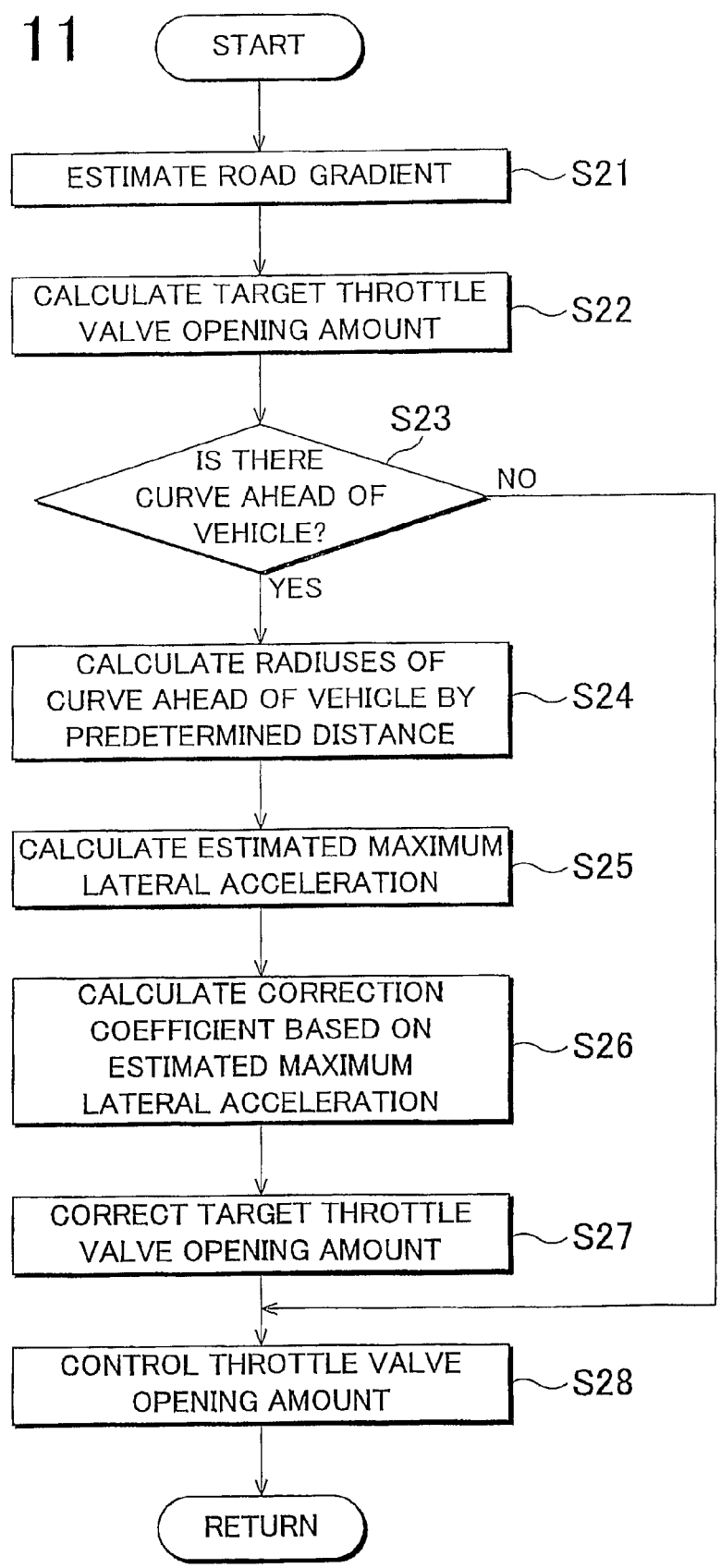
FIG. 11 is the flowchart showing the routine executed by the drive power control apparatus for a vehicle according to the third embodiment of the invention.

In step S24, the radiuses R of a curve ahead of the vehicle by a predetermined distance are successively calculated in real time (see FIGS. 9 and 10). The radiuses R of the curve are calculated based, for example, on the map information stored in the navigation system 95. The determination of the curve that is ahead of the vehicle by the predetermined distance is made based, for example, on the information on the vehicle position obtained by GPS and the map information stored in the navigation system 95.

In step S25, the estimated maximum lateral acceleration is calculated. The estimated maximum lateral acceleration is calculated by the following equation 9, using the minimum value among the multiple radiuses R successively calculated in step S24.

$$\text{Estimated maximum lateral acceleration} = \text{current vehicle speed}^2 / R0 \quad \text{Equation 9}$$

In the equation, R0 is the minimum value among the multiple radiuses R successively obtained in step S24.

In step S26, the correction coefficient is calculated based on the estimated maximum lateral acceleration. For example, the correction coefficient may be calculated based on the estimated maximum lateral acceleration using the map shown in FIG. 12. As shown in FIG. 12, as the estimated maximum lateral acceleration increases, the correction coefficient decreases (the minimum value of the correction coefficient is 0). On the other hand, as the estimated maximum lateral acceleration decreases, the correction coefficient increases.

When the estimated maximum lateral acceleration is equal to or close to 0, namely, when the curve ahead of the vehicle is almost straight, the correction coefficient is set to a value equal to or close to 0 (the drive power adjustment amount is not corrected). On the other hand, when the estimated maximum lateral acceleration is great, the driver feels that the vehicle should be sufficiently decelerated before the vehicle enters the curve. Accordingly, the amount by which the drive power is adjusted to compensate for the road gradient is set to a small value.

The relationship between the estimated maximum lateral acceleration and the correction coefficient is not limited to the relationship shown in FIG. 12. The correction coefficient may be set only when the estimated maximum lateral acceleration is equal to or greater than a predetermined value (in this case, the rate of change in the drive power adjustment amount is limited by a predetermined value). After step S26 is completed, step S27 is executed.

Because steps S27 and S28 are the same as steps S4 and S5 in FIG. 1, respectively, the description thereof will not be provided below. After step 28 is completed, the routine is executed again. If it is determined that there is a curve ahead of the vehicle (or the vehicle has not passed through the curve yet) in the newly executed routine ("YES" in step S23), the estimate maximum lateral acceleration corresponding to the radius R of the curve and the correction coefficient corresponding to the estimated maximum lateral acceleration are calculated (steps S25 and S26), and the target throttle valve opening amount is corrected based on the correction coefficient (steps S27 and S28).

Next, the effects of the third embodiment of the invention will be described. For example, when the estimated maximum lateral acceleration is excessively great, if the vehicle enters the curve without changing the vehicle speed, the vehicle speed is too high to go round the curve. If the estimated maximum lateral acceleration is great, the driver strongly feels that the vehicle should be sufficiently decelerated before the vehicle enters the curve. According to the third embodiment of the invention, as the estimated maximum lateral acceleration increases, the drive power adjustment amount is decreased. Accordingly, the drive power is adjusted without giving a sense of discomfort to the driver.

FIG. 9 shows an estimated maximum lateral acceleration 301, an actual lateral acceleration 302, a vehicle speed 303, a road gradient 304, a correction coefficient 305, a final drive power adjustment amount 306, and an uncorrected drive power adjustment amount 307 (according to conventional technology). FIG. 9 shows the case where the vehicle enters a curve when the road gradient 304 is increasing.

According to the conventional technology, when the road gradient 304 is increasing, the drive power adjustment amount 307 (before correction according to the third embodiment of the invention) increases. Accordingly, even if the driver releases the accelerator pedal, the deceleration required by the driver (the deceleration that is estimated to be achieved by releasing the accelerator pedal) is not achieved.

To minimize such inconvenience, according to the third embodiment of the invention, the radiuses R of the curve ahead of the vehicle by a predetermined distance (meters) are successively calculated (step S24 in FIG. 11), the estimated maximum lateral acceleration 301 corresponding to each radius R of the curve is calculated (step S25), and the correction coefficient 305 corresponding to each estimated maximum lateral acceleration 301 is calculated (step S26), as shown in FIG. 10. Because the throttle valve opening amount is corrected using the correction coefficient 305 (steps S27 and S28), the final drive power adjustment amount 306 is set to a value less than the uncorrected drive power adjustment amount 307 by the correction amount. Thus, when the driver releases the accelerator pedal, the vehicle decelerates by an amount greater than that according to the conventional technology. As a result, the drive power is controlled without giving a sense of discomfort to the driver.

Next, a first modified example of the third embodiment of the invention will be described with reference to FIGS. 13 and 14.

According to the third embodiment of the invention, the drive power adjustment amount is calculated based on the estimated maximum lateral acceleration. In contrast, according to the first modified example, the parameter used to calculate the drive power adjustment amount is not limited to the estimated maximum lateral acceleration. The drive power adjustment amount may be calculated based on any parameters that are obtained based on the radius R of a curve and the vehicle speed. In the following description, the drive power adjustment amount is calculated based on the required deceleration that is a parameter obtained based on the radius R of a curve and the vehicle speed.

The routine according to the first modified example will be described below with reference to FIG. 14.

Because steps S31 and S32 are the same as steps S1 and S2 in FIG. 1, respectively, and step S33 is the same as step S23 in FIG. 11, the description thereof will not be provided below.

In step S34, the radius R of a curve and the distance L between the current vehicle position and the center of the curve are calculated. The radius R of the curve is calculated based, for example, on the map information stored in the navigation system 95. The distance L between the current vehicle position and the center of the curve may be calculated based on the information on the current vehicle position obtained by GPS and the map information stored in the navigation system 95.

In step S35, the target turning vehicle speed Vreq is calculated. The target turning vehicle speed Vreq is calculated, for example, by the following equation (theory) 10. The target lateral acceleration Gyt used in the equation 10 may be a fixed value (e.g. 0.4 G). Alternatively, the target lateral acceleration Gyt may be variably set based on other information, for example, the manner in which the driver drives the vehicle.

$$Vreq = \sqrt{R \times Gyt \times g} \quad \text{<Equation 10>}$$

R: radius of curve R (m)

Gyt: target lateral acceleration G appropriate value (for example, 0.4 G)

g: gravitational acceleration 9.8 (m/s²)

In step S36, the required deceleration Greqx is calculated. The required deceleration Greqx is calculated by the following equation (theory) 11.

$$Gregx = \frac{V^2 - Vreq^2}{2 \times L \times g} \quad <\text{Equation 11}>$$

V: current vehicle speed (m/s)

L: distance between vehicle and center of curve (m)

In the above equation, L is the distance between the current vehicle position and the center of the curve. Alternatively, L may be the distance between the current vehicle position and the entrance of the curve. When the distance between the current vehicle position and the entrance of the curve is used as L, the required deceleration is maintained at a constant value and the correction coefficient calculated in step S37 is maintained from the entrance of the curve to the center of the curve.

In step S37, the correction coefficient is calculated based on the required deceleration. The correction coefficient is calculated based, for example, on the map shown in FIG. 15. When the required deceleration is a value equal to or close to 0, the correction coefficient is set to a value equal to or close to 1.0. When the required deceleration is great, the correction coefficient is set to a small value or 0.

Because steps S38 and S39 are the same as the steps S4 and S5 in FIG. 1, respectively, the description thereof will not be provided below.

According to the first modified example, the same effects as those in the third embodiment of the invention are obtained. Hereafter, the description will be provided with reference to FIG. 13.

Figure 13:
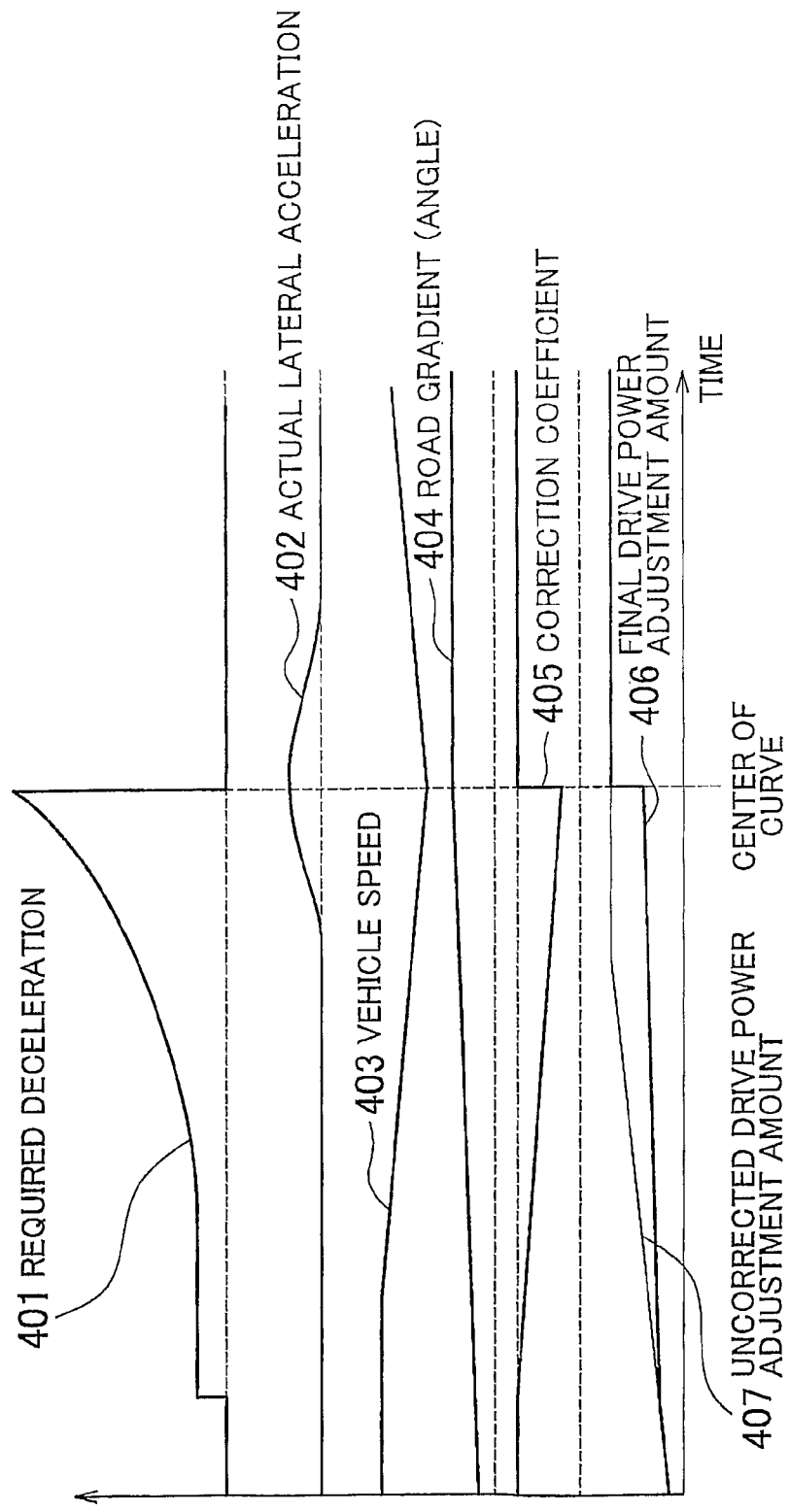
FIG. 13 is the time-chart for describing the operation of a drive power control apparatus for a vehicle according to a first modified example of the third embodiment of the invention.
Figure 14:
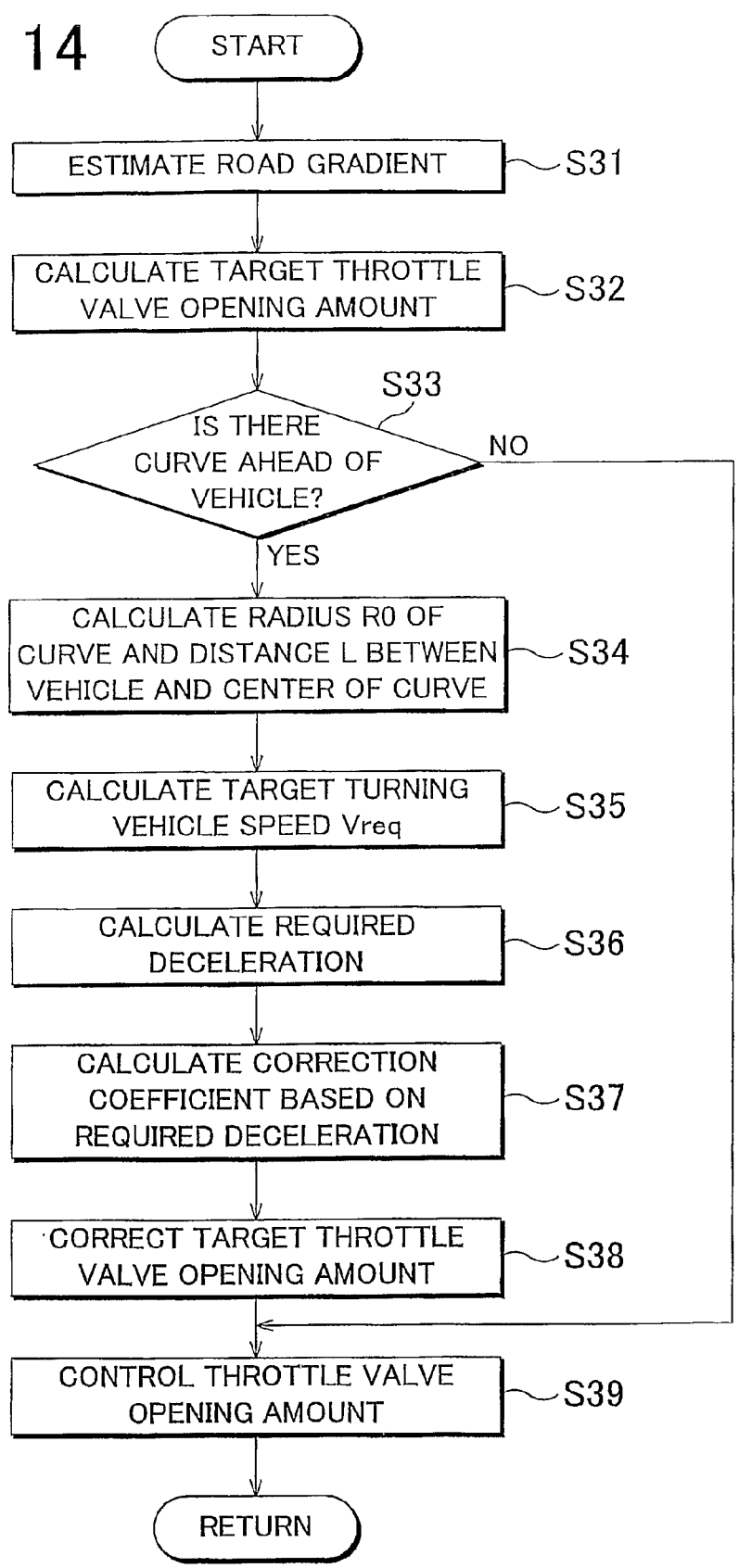
FIG. 14 is the flowchart showing the routine executed by the drive power control apparatus for a vehicle according to the first modified example of the third embodiment of the invention.

FIG. 13 shows a required deceleration 401, an actual lateral acceleration 402, a vehicle speed 403, a road gradient 404, a correction coefficient 405, a final drive power adjustment amount, and an uncorrected drive power adjustment amount 407 (according to the conventional technology). FIG. 13 shows the case where the vehicle enters a curve when the road gradient 404 is increasing.

According to the conventional technology, when the road gradient 404 is increasing, the drive power adjustment amount 407 (before correction according to the third embodiment of the invention) also increases. Accordingly, even if the driver releases the accelerator pedal, the deceleration required by the driver (the deceleration that is estimated to be achieved by releasing the accelerator pedal) is not achieved.

According to the first modified example of the third embodiment of the invention, the required deceleration (Greqx) 401 is calculated (step S36), and the correction coefficient 405 corresponding to the required deceleration 401 is calculated (step S37). Because the throttle valve opening amount is corrected using the correction coefficient 405 (steps S38 and S39), the final drive power adjustment amount 406 is set to a value less than the uncorrected drive power adjustment amount 407 by an amount corresponding to the correction amount. Thus, when the driver releases the accelerator pedal, the vehicle decelerates by an amount greater than that according to the conventional technology. Accordingly, the drive power is controlled without giving a sense of discomfort to the driver.

A second modified example of the third embodiment of the invention will be described. According to the first modified example, the correction coefficient (the drive power adjustment amount) is calculated based on the required deceleration Greqx. If the correction coefficient (the drive power adjustment amount) is calculated based on the required deceleration Greqx, the following inconvenience may occur.

Figure 16:
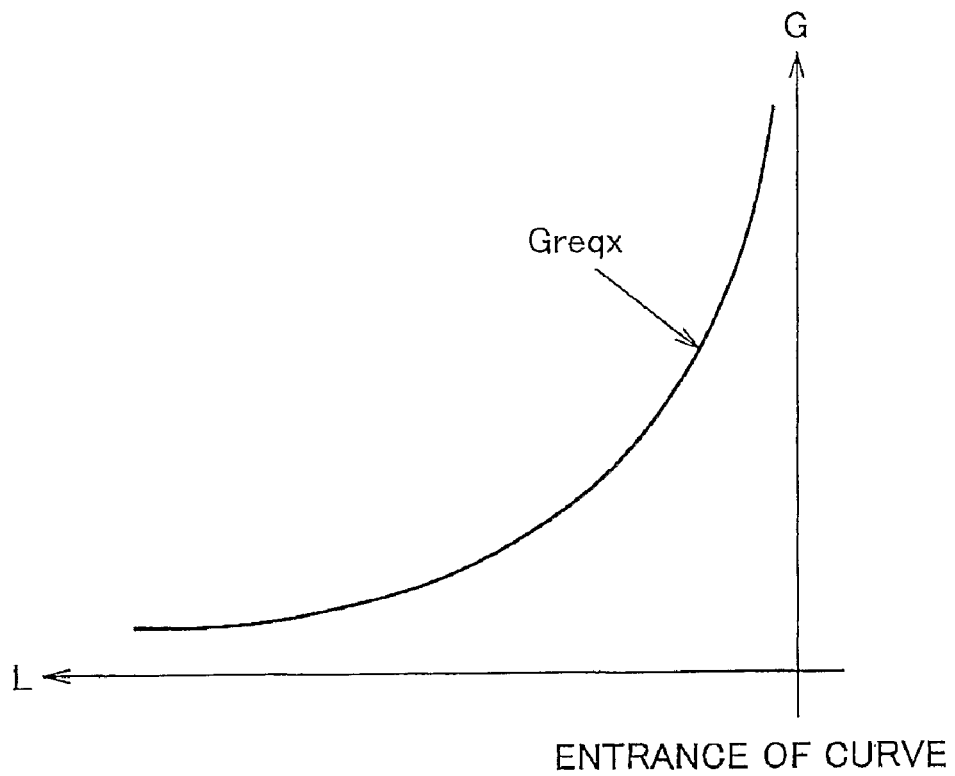
FIG. 16 is the graph for describing the inconvenience that will be minimized by a drive power control apparatus for a vehicle according to a second modified example of the third embodiment of the invention.

FIG. 16 shows the relationship between the distance L from the current vehicle position to the entrance of a curve and the required deceleration Greqx calculated by the equation 11. In the equation 11, the term including the distance L is in the denominator. Accordingly, even when the current vehicle speed V exceeds the target turning vehicle speed Vreq only slightly, if the distance L is short, the required deceleration Greqx reaches an infinite value, as shown in FIG. 16. Accordingly, when the distance L is short, if the correction coefficient (the drive power adjustment amount) is set based on the required deceleration Greqx, the driver may feel a sense of discomfort.

As shown in FIG. 16, when the distance L is relatively long, the required deceleration Greqx is not excessively greater than the actually required value. Accordingly, setting the correction coefficient (the drive power adjustment amount) based on the required deceleration Greqx does not cause any inconveniences. On the other hand, when the distance L is short, the required deceleration Greqx is excessively greater than the actually required value. Accordingly, it is not appropriate to set the correction coefficient (the drive power adjustment amount) based on the required deceleration Greqx. Therefore, it is not appropriate to execute the deceleration control based only on the required deceleration Greqx calculated by the equation 11. When the distance L is relatively short, the norm (the required deceleration) used to set the correction coefficient needs to be corrected. Such inconvenience is minimized by the second modified example of the third embodiment of the invention.

According to the second modified example, if the throttle valve opening amount (the drive power adjustment amount) is controlled when the vehicle is at a position distant from the entrance of the curve, the correction coefficient (the drive power adjustment amount) may be calculated based on the first deceleration (the same as the required deceleration Greqx) determined based on the distance from the current vehicle position to the entrance of the curve. On the other hand, if the throttle valve opening amount is controlled when the vehicle is at a position close to the entrance of the curve, the correction coefficient (the drive power adjustment amount) may be calculated based on the second deceleration Greqy determined in accordance with the lateral acceleration that is estimated to be applied to the vehicle when the vehicle enters the curve.

The second deceleration Greqy is calculated by the following equation 12.

$$Greqy = f\{\Delta Gy\} \quad <\text{Equation 12}>$$

ΔGy: difference between target lateral acceleration and estimated lateral acceleration ΔGy: Gyf−Gyt The estimated lateral acceleration is the lateral acceleration that will be applied to the vehicle if the vehicle enters the curve at the current vehicle speed V. The estimated lateral acceleration Gyf is calculated by the following equation 13.

$$Gyf = \frac{V^2}{R \times g} \quad \text{<Equation 13>}$$

According to the second modified example, the lateral acceleration difference ΔGy is used as the index for calculating the drive power adjustment amount, because the amount by which the vehicle needs to be decelerated before entering the curve is roughly calculated based on the lateral acceleration difference ΔGy.

Figure 17:
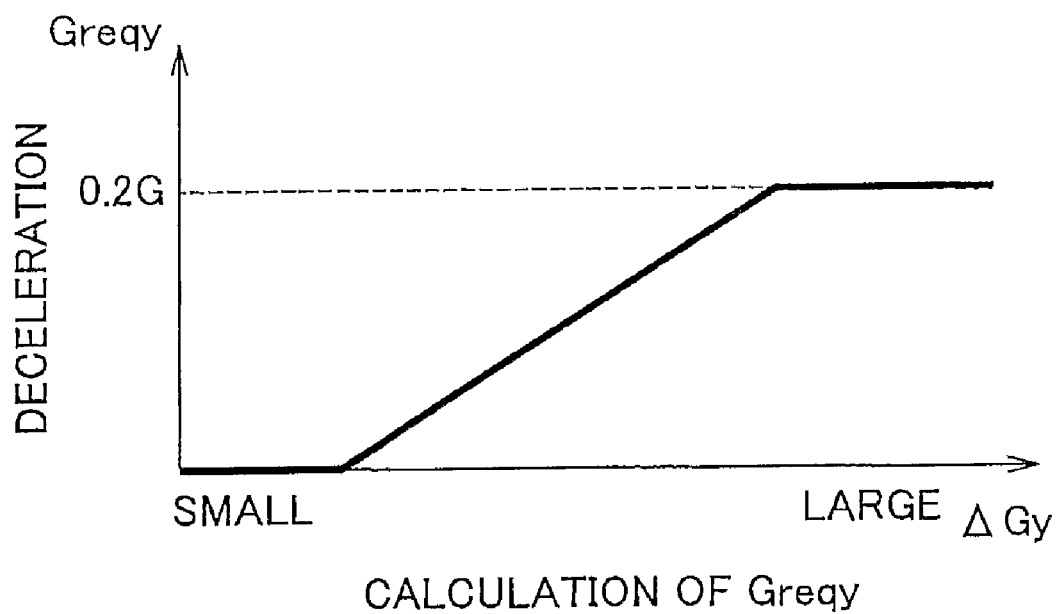
FIG. 17 is the graph for describing a second deceleration that is achieved by the drive power control apparatus for a vehicle according to the second modified example of the third embodiment of the invention.

The second deceleration Greqy may be calculated based on the lateral acceleration difference ΔGy using, for example, the relationship (map), shown in FIG. 17, set in advance. The relationship between the second deceleration Greqy and the lateral acceleration difference ΔGy is set in advance based on experiments, experiences, etc. The equation for calculating the first deceleration (the required deceleration) Greqx includes the term including the distance L, as shown in the equation 11. As a result, when the distance L is short, the first deceleration (the required deceleration) is excessively great (an infinite value). To minimize such inconvenience, according to the second modified example, the lateral acceleration difference ΔGy is used, because the lateral acceleration difference ΔGy is independent of the distance L and is an appropriate index used to determine the drive power adjustment amount.

As shown in FIG. 17, as the lateral acceleration difference ΔGy increases, the amount, by which the vehicle needs to decelerate before entering the curve, increases. Accordingly, as the lateral acceleration difference ΔGy increases, the second deceleration Greqy is set to a greater value. On the other hand, as the lateral acceleration difference ΔGy decreases, the amount, by which the vehicle needs to decelerate before entering the curve, decreases. Accordingly, as the lateral acceleration difference ΔGy decreases, the second deceleration Greqy is set to a smaller value. When the lateral acceleration difference ΔGy is equal to or less than a predetermined value, the second deceleration Greqy is set to 0. When the vehicle enters the curve at a vehicle speed slightly higher than the target turning vehicle speed Vreq (when the lateral acceleration difference ΔGy is equal to or less than a predetermined value), the vehicle can go round the curve without problems. In such a case, the second deceleration Greqy is not used.

A third modified example of the third embodiment of the invention will be described. According to the third embodiment of the invention and the first and second modified examples of the third embodiment, the drive power adjustment amount is limited based on the estimated maximum lateral acceleration, the required deceleration, the first deceleration or the second deceleration. Alternatively, the drive power adjustment amount may be limited based on the following information on the curve. 1) The drive power adjustment amount is limited based on the distance between the current vehicle position and the entrance of the curve. 2) The drive power adjustment amount is limited when the distance between the current vehicle position and the entrance of the curve is equal to or shorter than a predetermined value. 3) The drive power adjustment amount is limited if it is determined that there is a curve (or the radius of a curve) ahead of the vehicle by a predetermined distance. The predetermined distance may be a fixed value or the product of the current vehicle speed and a predetermined time period. 4) The drive power adjustment amount is limited when the radius R of the curve present ahead of the vehicle by a predetermined distance is shorter than a predetermined value. 5) The drive power adjustment amount is limited based on the vehicle speed.

A fourth modified example of the third embodiment of the invention will be described below. According to the fourth modified example, the drive power adjustment amount may be limited based on the manner in which the driver drives the vehicle. The more sport-oriented the driving manner of the driver is, the greater deceleration the driver expects when the driver releases the accelerator pedal before the vehicle enters a curve. According to the fourth modified example, the correction coefficient (the drive power adjustment amount) is calculated based on the manner in which the driver drives the vehicle, as shown in FIG. 19.

A driving manner estimation unit (not shown) that estimates the driving manner of the driver may be included in the CPU 131. The driving manner estimation unit estimates the driving manner of the driver (whether the driver drives the vehicle in the sport-oriented driving manner or the normal driving manner) based on the manner in which the driver drives the vehicle and the manner in which the vehicle runs. The driving manner estimation unit will be described later in detail. The configuration of the driving manner estimation unit is not limited to the configuration described below. Various configurations may be employed as long as the driving manner of the driver is estimated. The sport-oriented driving manner signifies the driving manner reflecting the following tendency or preference of the driver; the driver gives priority to high engine performance, the driver tends to accelerate the vehicle rapidly, or the driver prefers quick response of the vehicle to the operation performed by the driver.

The driving manner estimation unit includes a neural network NN. Each time any one of multiple operation-related parameters is calculated, the calculated operation-related parameter is input in the neural network NN, and estimation function is activated in the neural network NN. The driving manner estimation unit estimates the driving manner of the driver based on the output from the neural network NN.

Figure 18:
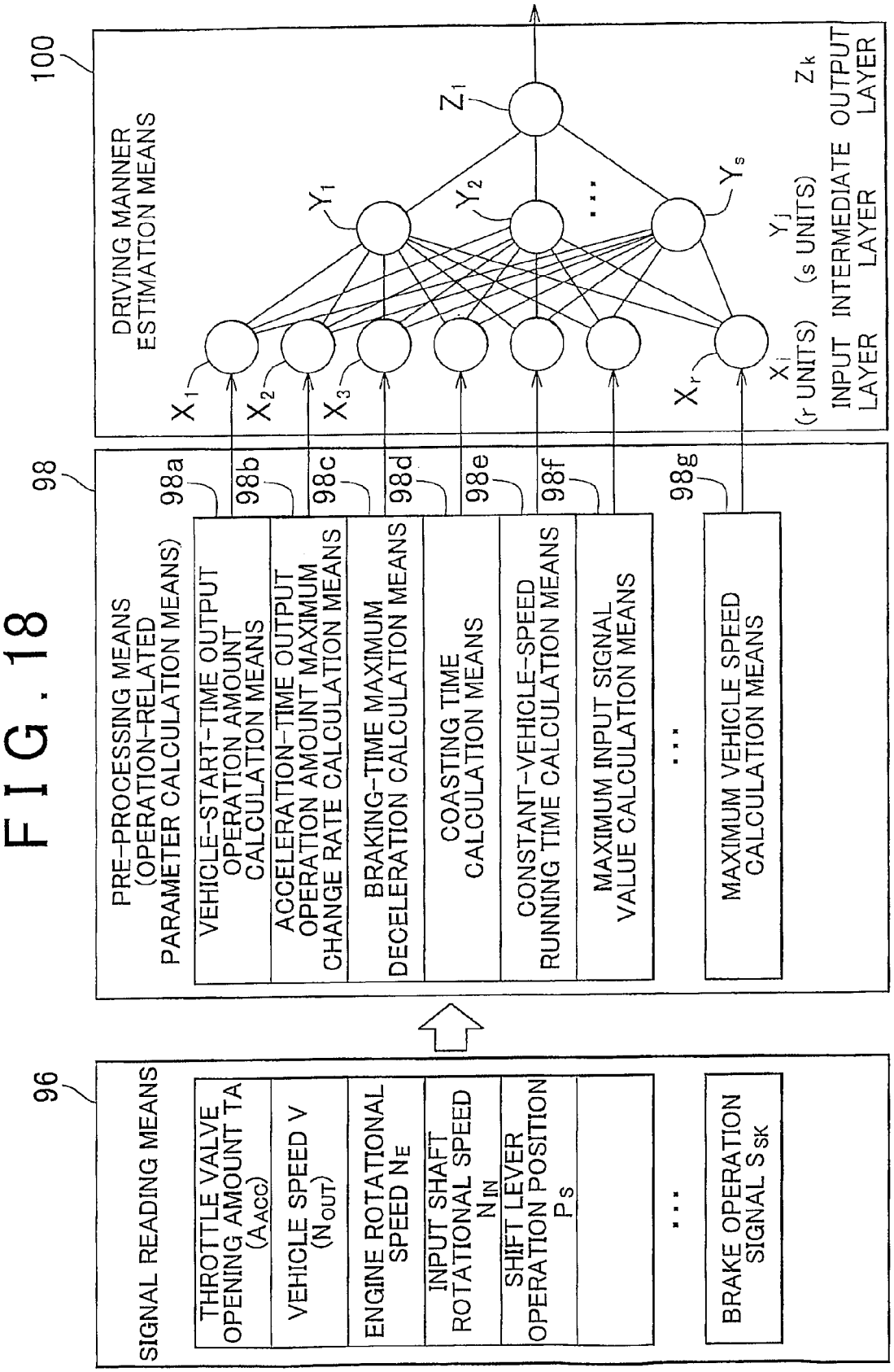
FIG. 18 is the diagram for describing driving manner estimation means of a drive power control apparatus for a vehicle according to a fourth modified example of the third embodiment of the invention.

For example, the driving manner estimation unit includes signal reading means 96, preprocessing means 98 and driving manner estimation means 100, as shown in FIG. 18. The signal reading means 96 reads the signals indicating the values detected by the various sensors at relatively short intervals. The preprocessing means 98 is operation-related parameter calculation means for calculating multiple operation-related parameters that are closely related to the operations reflecting the driving manner. The multiple operation-related parameters include the output operation amount (the accelerator pedal operation amount) when the vehicle is started, that is, the throttle valve opening amount $TA_{ST}$ when the vehicle is started; the maximum rate of change in the output operation amount when the operation for accelerating the vehicle is performed, that is, the maximum rate $ACC_{MAX}$ of change in the throttle valve opening amount; the maximum deceleration $G_{NMAX}$ achieved when the operation for applying a braking force to the vehicle is performed; the time $T_{COAST}$ during which the vehicle coasts; the time $T_{VCONST}$ during which the vehicle runs at a constant vehicle speed; the maximum value among the values indicated by the signals transmitted from each sensor during a predetermined time period; and the maximum vehicle speed $V_{max}$ that is achieved after the vehicle is started. The driving manner estimation means 100 includes the neural network NN. Each time the operation-related parameter is calculated by the preprocessing means 98, the calculated operation-related parameter is input in the neural network NN, and the neural network NN executes computation to estimate the driving manner of the driver. The driving manner estimation means 100 outputs the driving manner estimate value, which is an output from the neural network NN.

The preprocessing means 98 in FIG. 18 includes vehicle-start-time output operation amount calculation means 98*a* for calculating the output operation amount when the vehicle is started, that is, the throttle valve opening amount $TA_{ST}$ when the vehicle is started; acceleration-time output operation amount maximum change rate calculation means 98*b* for calculating the maximum rate of change in the output operation amount when the operation for accelerating the vehicle is performed, namely, the maximum rate $A_{CCMAX}$ of change in the throttle valve opening amount; braking-time maximum deceleration calculation means 98*c* for calculating the maximum deceleration $G_{NMAX}$ which is achieved when a braking force is applied to the vehicle; coasting time calculation means 98*d* for calculating the time $T_{COAST}$ during which the vehicle is coasting; constant-vehicle-speed running time calculation means 98*e* for calculating the time $T_{VCONST}$ during which the vehicle is running at a constant vehicle speed; maximum input signal value calculation means 98*f* for periodically calculating the maximum value among the values indicated by the signals transmitted from each sensor during a predetermined time period, for example, approximately three seconds; and maximum vehicle speed calculation means 98*g* for calculating the maximum vehicle speed $V_{max}$ that is achieved after the vehicle is started.

The maximum input signal value calculation means 98*f* calculates the maximum value of the throttle valve opening amount $TA_{maxt}$, the vehicle speed $V_{maxt}$, the engine rotational speed $N_{Emaxt}$, the longitudinal acceleration $NOGBW_{maxt}$ (a negative value during deceleration), or the deceleration $G_{NMAXt}$ (the absolute value) transmitted during the predetermined time period. The longitudinal acceleration $NOGBW_{maxt}$ or the deceleration $G_{NMAXt}$ is calculated based, for example, on the rate of change in the vehicle speed V ($N_{OUT}$).

The neural network NN included in the driving manner estimation means 100 in FIG. 18 may be formed by modeling a nerve cell group of a living body using software formed of a computer program or hardware formed of a combination of electronic elements. For example, the neural network NN may have a configuration shown in the box indicating the driving manner estimation means 100 in FIG. 18.

As shown in FIG. 18, the neural network NN has a trilaminar configuration including an input layer formed of r units of neurons Xi (X1 to Xr), an intermediate layer formed of s units of neurons Yj (Y1 to Ys), and an output layer formed of t units of neurons Zk (Z1 to Zt). In order to transmit the conditions of the neurons from the input layer toward the output layer, there are provided a transmittal element $D_{Xij}$ that connects the r units of neurons Xi to s units of neurons Yj using a connection coefficient (weight) $W_{Xij}$, and a transmittal element $D_{Yjk}$ that connects s units of neurons Yj to t units of neurons Zk using a connection coefficient (weight) $W_{Yjk}$.

The neural network NN is a pattern association system in which the connection coefficient (weight) $W_{Xij}$ and the connection coefficient (weight) $W_{Yjk}$ are learned by a co-called back-propagation learning algorithm. The learning is completed in advance by road tests conducted to associate the values of the operation-related parameters with the driving manners. Accordingly, when the vehicle is assembled, the connection coefficient (weight) $W_{Xij}$ and the connection coefficient (weight) $W_{Yjk}$ are set to fixed values.

To perform the above-described learning, the road tests are conducted by multiple drivers. These drivers drive the vehicles in the sport-oriented driving manner and in the normal driving manner on various types of roads, for example, a high-way, a suburban road, a mountain road, and a city road. The driving manner derived through the tests is used as a teacher signal, and the teacher signal and the n units of indexes (input signals) obtained by preprocessing the signals from the sensors are input in the neural network NN. The teacher signals indicate the driving manners converted into numerals from 0 to 1. For example, the normal driving manner is indicated by the numeral 0, and the sport-oriented driving manner is indicated by the numeral 1. The input signal is normalized to a value from −1 to +1, or from 0 to 1, and then used.

As shown in FIG. 19, the correction coefficient is changed based on the driving manner determined by the driving manner estimation unit. If it is determined that the driver drives the vehicle in the normal driving manner, the correction coefficient is set to 1.0. As the degree of sport-orientation increases, the correction coefficient is set to a smaller value. If it is determined that the degree of sport-orientation is high, the correction coefficient is set to 0.

In the description above, the driving manner is estimated by the driving manner estimation unit. Alternatively, the driver may input his/her driving manner in the control circuit 130 by, for example, operating a switch.

A fifth modified example of the third embodiment of the invention will be described below. According to the third embodiment of the invention and the first to fourth modified examples of the third embodiment of the invention, the correction coefficient is changed in association with the curvature (or the radius R) of a curve. However, the parameter used to change the coefficient is not limited to the curvature of a curve. The correction coefficient may be changed based on the running environment parameters other than the curvature of a curve and in accordance with the situation where the vehicle needs to decelerate (e.g. when there is a stop sign, a railroad crossing, or an intersection, when the vehicle goes out of a freeway, when there is a toll booth, when the distance from the preceding vehicle is short, when the estimated duration of time before a crash is short, or when there is an obstacle ahead of the vehicle). For example, when the vehicle needs to stop (e.g. when there is a railroad crossing or a toll booth), the target vehicle speed may be set to 0. When the distance between the vehicle and the point at which the vehicle needs to stop is equal to or shorter than a predetermined value, the adjustment of the drive power to compensate for the external factor (e.g. the road gradient of an uphill slope) may be cancelled. Alternatively, as the distance from the vehicle to the point at which the vehicle needs to stop decreases, the drive power adjustment amount may be decreased.

Figure 20:
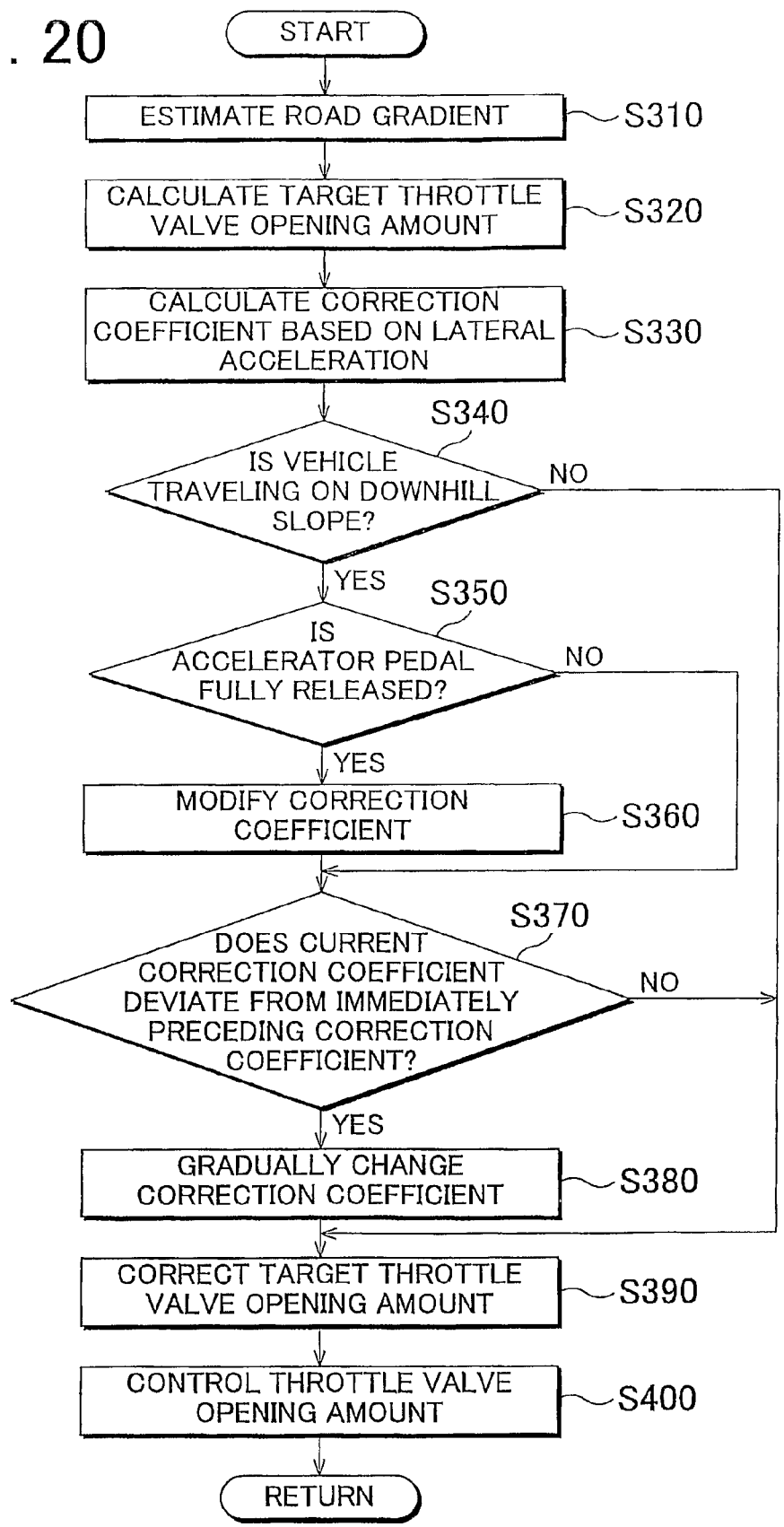
FIG. 20 is the flowchart showing the routine executed by the drive power control apparatus for a vehicle according to a fourth embodiment of the invention.

A drive power control apparatus and method for a vehicle according to a fourth embodiment of the invention will be described with reference to FIGS. 20 to 22. The description on the same portions as those in the above-described embodiments will not be provided below.

When the control for compensating for the road gradient of a downhill slope is executed (e.g. when the control for closing the electronically-controlled throttle valve by an amount required to compensate for the road gradient is executed), the driver may feel a sense of discomfort. Namely, when the vehicle is going out of a curve, or when the vehicle starts traveling on a straight road after passing through the curve, the driver attempts to accelerate the vehicle by depressing the accelerator pedal. However, the acceleration that the driver expects may not be achieved, because the electronically-controlled throttle valve is closed by the amount required to compensate for the road gradient. While the vehicle is going round a curve in a downhill slope, even if the driver depresses the accelerator pedal, the vehicle does not accelerate as expected, and the driver may feel a sense of discomfort. Such inconvenience is minimized according to the fourth embodiment of the invention.

The routine executed according to the fourth embodiment of the invention will be described with reference to FIG. 20.

Because steps S310 to S330 are the same as steps S1 to S3 in FIG. 1, respectively, the description thereof will not be provided below.

In step S340, it is determined whether the vehicle is traveling on a downhill slope. For example, if the road gradient calculated in step S310 is less than a predetermined value, or if the situation where the road gradient is less than the predetermined value continues for a predetermined time period, it is determined that the vehicle is traveling on a downhill slope. If it is determined in step S340 that the vehicle is traveling on a downhill slope, step S350 is executed. On the other hand, if it is determined that the vehicle is not traveling on a downhill slope, step S390 is executed. If a negative determination is made in step S340 and step S390 is executed, the same control as that in the first embodiment is executed.

In step S350, it is determined whether the accelerator pedal is fully released based on the accelerator pedal operation amount detected by the accelerator pedal operation amount sensor 114. If it is determined that the accelerator pedal is fully released, step S360 is executed. On the other hand, if it is determined that the accelerator pedal is not fully released, step S370 is executed.

In the control, when the vehicle is going round a curve in a downhill slope, the amount by which the drive power is adjusted to compensate for the road gradient (the amount by which the electronically-controlled throttle valve is closed) is decreased to increase the drive power. While the vehicle is going round a curve, if the drive power is increased although the accelerator pedal operation amount is maintained substantially constant, the lateral acceleration applied to the vehicle increases. As a result, the driver may feel a sense of discomfort. In order to minimize such inconvenience, the control for increasing the drive power is executed only when the accelerator pedal is fully released.

In the above description, the control for increasing the drive power is executed only when the accelerator pedal is fully released. Alternatively, the following control may be executed. The correction coefficient is gradually changed from the correction coefficient calculated in step S3 to the correction coefficient calculated in step S6. In addition, the sweep rate (the change rate) is changed between when the accelerator pedal is depressed and when the accelerator pedal is fully released. Thus, it is possible to change the correction coefficient while minimizing a sense of discomfort felt by the driver.

In step S360, the correction coefficient is modified. In step S360, the correction coefficient is uniformly modified to 0. Alternatively, the correction coefficient may be modified based on the lateral acceleration as shown in FIG. 21, because as the lateral acceleration applied to the vehicle increases, the tendency of the driver to drive the vehicle in the sport-oriented manner increases. In the map in FIG. 21, when the absolute value of the lateral acceleration exceeds 0.8 G the correction coefficient is set to a value that is smaller than that the absolute value of the lateral acceleration is less than 0.8 G and is equal to or more than 0.4 G. This is because, if the drive power is abruptly increased when the absolute value of the lateral acceleration is great, the vehicle may behave unstably.

Instead of this, in step S360, the correction coefficient may be modified only when the absolute value of the lateral acceleration is equal to or higher than a predetermined value.

In step S370, it is determined whether the current correction coefficient differs from the immediately preceding value of the correction coefficient. When the correction coefficient is modified in step S360, an affirmative determination is made in step S370. If an affirmative determination is made in step S370, step S380 is executed. On the other hand, if a negative determination is made in step S370, step S390 is executed.

In step S380, the correction coefficient is gradually changed from the immediately preceding value. When the correction coefficient derived through the modification made in step S360 is less than the correction coefficient calculated in step S330, if the correction coefficient is rapidly changed to the correction coefficient derived through the modification made in step S360, the drive power may abruptly increase and the driver may feel a sense of discomfort. According to the fourth embodiment of the invention, the correction coefficient is gradually changed to minimize such inconvenience.

In this case, the sweep rate is set to a constant value. Alternatively, as shown in FIG. 22, when the accelerator pedal operation amount is great, that is, the driver intends to accelerate the vehicle by a great amount, the sweep rate may be set so that the correction coefficient is changed gradually. On the other hand, when the accelerator pedal operation amount is small, that is, the driver intends to accelerate the vehicle by only a small amount, the sweep rate may be set so that the correction coefficient is changed rapidly.

Because steps S390 and S400 are the same as steps S4 and S5, respectively, the description thereof will not be provided below.

The accelerator pedal may be fully released while the vehicle is going round a curve. Then, the vehicle needs to be accelerated to go out of the curve and start traveling on a straight road after passing through the curve. According to the fourth embodiment of the invention, when the vehicle is going round a curve in a downhill slope, the drive power adjustment amount (the amount by which the electronically-controlled throttle valve is closed) is set to a small value in order to achieve sufficient acceleration in accordance with the accelerator pedal operation amount. As described above, when the vehicle is going round a curve (when the operation for fully releasing the accelerator pedal is cancelled, and the vehicle goes out of the curve and starts traveling on a straight road after passing through the curve), the acceleration of the vehicle needs to be increased. Accordingly, the drive power adjustment amount (the amount by which the electronically-controlled throttle valve is closed) is made less than that when the vehicle is traveling on a straight road (the regions other than the region in which the acceleration of the vehicle needs to be increased).

The first to fourth embodiments may be combined with each other as required.

Next, a drive power control apparatus and method for a vehicle according to a fifth embodiment of the invention will be described below with reference to FIGS. 23 to 26. The description on the portions that are the same as those in the embodiments and the modified examples of the embodiments described above will not be provided below.

According to the first embodiment of the invention, the amount by which the drive power is adjusted to compensate for the external factor-related parameters such as the road gradient is decreased when the vehicle is going round a curve to suppress occurrence of unstable vehicle behavior even if the accelerator pedal is operated somewhat roughly. According to the second embodiment of the invention, the drive power adjustment amount is made less than that in the conventional technology by an amount corresponding to the cornering resistance by excluding the cornering resistance from the external factor-related parameters. Thus, occurrence of unstable vehicle behavior is suppressed even if the accelerator pedal is operated somewhat roughly.

The adjustment amount decrease control for decreasing the drive power adjustment amount is executed while the vehicle is going round a curve (the first and second embodiments). After the vehicle has passed through the curve, the adjustment amount decrease control ends. In this case, the drive power adjustment amount after the vehicle has passed through the curve differs from the drive power adjustment amount when the vehicle is going round the curve by an amount by which the drive power adjustment amount is decreased. When the vehicle is traveling on a road in which there are successive curves in which there are successive curves, the state in which the vehicle is going round a curve and the state in which the vehicle has passed through the curve are frequently switched. Accordingly, when the vehicle is traveling on the road in which there are successive curves, the difference in the drive power adjustment amount (the drive power) is frequently caused, namely, the drive power adjustment amount is repeatedly and frequently increased and decreased. As a result, the driver may feel a sense of discomfort. According to the fifth embodiment of the invention, it is possible to suppress the reduction in the drivability which is caused by repeatedly and frequently increasing and decreasing the drive power adjustment amount while the vehicle is traveling on the road in which there are successive curves.

The fifth embodiment of the invention will be described below in detail with reference to FIGS. 25 and 26. The description will be made concerning the case where the adjustment amount decrease control for decreasing the drive power adjustment amount is executed according to the first embodiment of the invention while the vehicle is going round a curve. Alternatively, the adjustment amount decrease control according to the second embodiment of the invention may be executed instead of according to the first embodiment of the invention, or the adjustment amount decrease control according to the combination of the second embodiment with the first embodiment of the invention may be executed.

Figure 25:
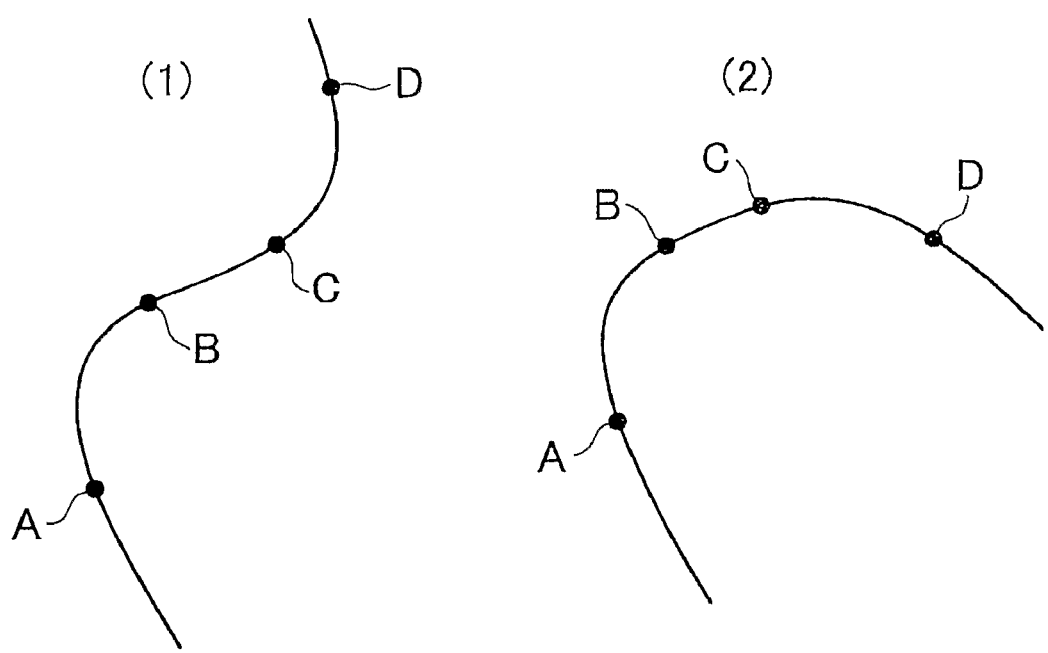
FIG. 25 is the view for describing the road in which there are successive curves, and for describing the control executed by the drive power control apparatus for a vehicle according to the fifth embodiment of the invention.

FIG. 25 shows a road in which there are successive curves. In FIG. 25(1), there is a right-hand curve that starts at point A and ends at point B. The road from point B to point C is substantially straight. In addition, there is a left-hand curve that starts at point C and ends at point D. The road configuration in FIG. 25(2) differs from the road configuration in FIG. 25(1) in that there is a right-hand curve that starts at point C and ends at point D.

Figure 26:
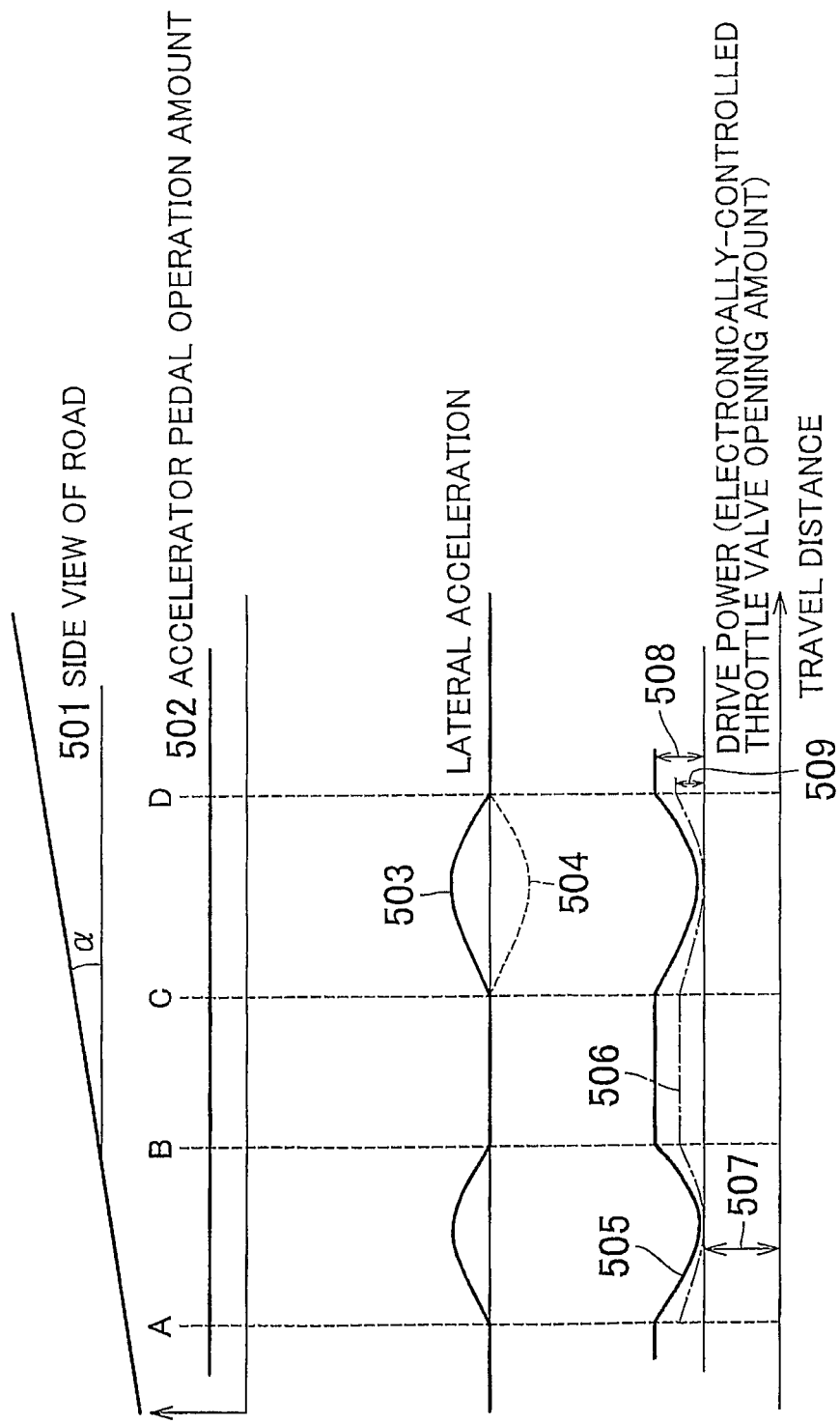
FIG. 26 is the view for describing the operation of the drive power control apparatus for a vehicle according to the fifth embodiment of the invention.

FIG. 26 is the chart showing the case where the vehicle travels on the road in which there are successive curves shown in FIG. 25. FIG. 26 shows a side view 501 of the road, an accelerator pedal operation amount 502, a lateral acceleration 503 that is applied to the vehicle when the vehicle travels on the road in which there are successive curves shown in FIG. 25(2), a lateral acceleration 504 that is applied to the vehicle when the vehicle travels on the road in which there are successive curves shown in FIG. 25(1), an opening amount 505 of the electronically-controlled throttle valve (the drive power) when the control according to the fifth embodiment of the invention is not executed, and an opening amount 506 of the electronically-controlled throttle valve (the drive power) when the control according to the fifth embodiment of the invention is executed.

FIG. 26 also shows a throttle valve opening amount 507 corresponding to the accelerator pedal operation amount 502, and an opening amount 508 of the electronically-controlled throttle valve that is added to the throttle valve opening amount 507 to compensate for the road gradient α. The sum of the throttle valve opening amount 507 and the throttle valve opening amount 508 corresponds to the target throttle valve opening amount calculated in step S2 in FIG. 1. Although not shown in FIG. 26, the vehicle speed is substantially constant from point A to point D (the radius of the curve is sufficiently great so that the vehicle goes round the curve even at the substantially constant vehicle speed).

Because the accelerator pedal operation amount 502 is maintained constant from point A to point D, the throttle valve opening amount 507 that corresponds to the accelerator pedal operation amount 502 is also maintained constant from point A to point D (see FIG. 3). As shown in the side view 501 of the road, the uphill road gradient is the constant value α from point A to point D. Therefore, usually (when the vehicle is not going round a curve), the constant opening amount 508 of the electronically-controlled throttle valve is added to the throttle valve opening amount 507 to set the target throttle valve opening amount (=507+508).

From point A to point B and from point C to point D, the lateral accelerations 503 and 504 increase because the vehicle is going round a curve. Therefore, the throttle valve opening amount 505 that is added to the throttle valve opening amount 507 to compensate for the running resistance is set to a value smaller than the throttle valve opening amount 508, according to the first embodiment of the invention. The sum of the throttle valve opening amount 507 and the throttle valve opening amount 505 corresponds to the corrected target throttle valve opening amount calculated in step S4 in FIG. 1.

When the adjustment amount decrease control for decreasing the drive power adjustment amount 505 is executed while the vehicle is going round a curve (from point A to point B and from point C to point D) according to the first embodiment of the invention, the adjustment amount decrease control ends at the points at which the curves end (at point B and point D), and the throttle valve opening amount, which is added to the throttle valve opening amount 507, is returned to the throttle valve opening amount 508 (=the throttle valve opening amount 505 at point B). At this time, a difference is caused in the drive power adjustment amount between when the vehicle is going round a curve (from point A to point B and from point C to point D) and when the vehicle has passed through the curves (from point B to point C and after point D) by the amount corresponding to the difference between the throttle valve opening amount 505 before point B and the throttle valve opening amount 505 at point B (=the throttle valve opening amount 508).

As shown in FIG. 25, the state in which the vehicle is going round a curve and the state in which the vehicle has passed through the curve are frequently switched while the vehicle is traveling on the road in which there are successive curves. Accordingly, while the vehicle is traveling on the road in which there are successive curves, the difference is periodically caused in the drive power adjustment amount, namely, the drive power adjustment amount is periodically increased and decreased. As a result, the driver may feel a sense of discomfort.

Immediately before the vehicle reaches point A, which is the first point, to enter the curve from point A to point B, if the driver fully releases the accelerator pedal, the drive power is made 0. Accordingly, the driver may feel a sense of discomfort only slightly. In contrast, immediately before the vehicle reaches point C to enter the curve from point C to point D, the vehicle speed may not be sufficiently decreased even if the driver fully releases the accelerator pedal and, therefore, the driver may feel a sense of discomfort. This is because, the driver has depressed the accelerator pedal to go out of the curve from point A to point B, and the amount, by which the drive power adjustment amount 505 is decreased, is set to a small value (e.g. 0) due to a decrease in the lateral acceleration 503 (the amount by which the throttle valve opening amount 505 is made less than the throttle valve opening amount 508). According to the fifth embodiment of the invention, the amount by which the drive power is adjusted to compensate for the external factor-related parameters (the throttle valve opening amounts 506 and 509) is decreased when the vehicle is traveling on the road in which there are successive curves. Thus, a sense of discomfort felt by the driver is reduced.

According to the fifth embodiment of the invention, the control is executed so that the drive power adjustment amount 509 that is added to compensate for the road gradient α when the vehicle is traveling on the road in which there are successive curves is made less than the drive power adjustment amount 508 that is added to compensate for the road gradient α when the road on which the vehicle is traveling is not a road in which there are successive curves. According to the fifth embodiment of the invention, when the vehicle is traveling on the road in which there are successive curves, as shown by the drive power adjustment amount 506, even if the drive power adjustment amount 506 when the vehicle is going round a curve made less than the drive power adjustment amount 506 when the vehicle is not going round a curve according to the first embodiment of the invention (steps S120 and S170 in FIG. 23), the drive power adjustment amount 509 for compensating for the road gradient α is originally small. Accordingly, the difference in the drive power adjustment amount 507 between when the vehicle is going round a curve and when the vehicle has passed through the curve is small. Thus, a sense of discomfort felt by the driver is suppressed.

Figure 23:
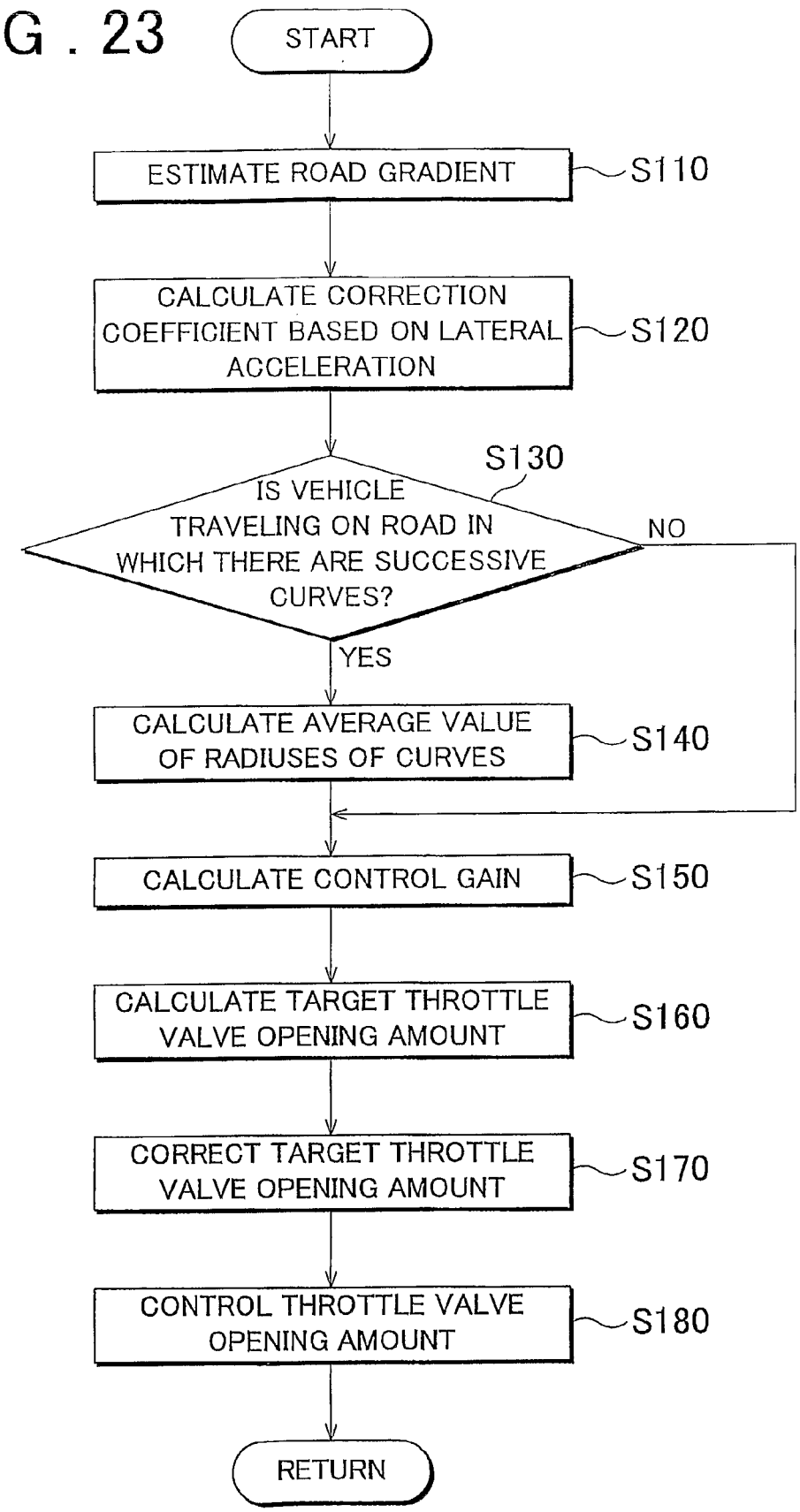
FIG. 23 is the flowchart showing the routine executed by a drive power control apparatus for a vehicle according to a fifth embodiment of the invention.
Figure 24:
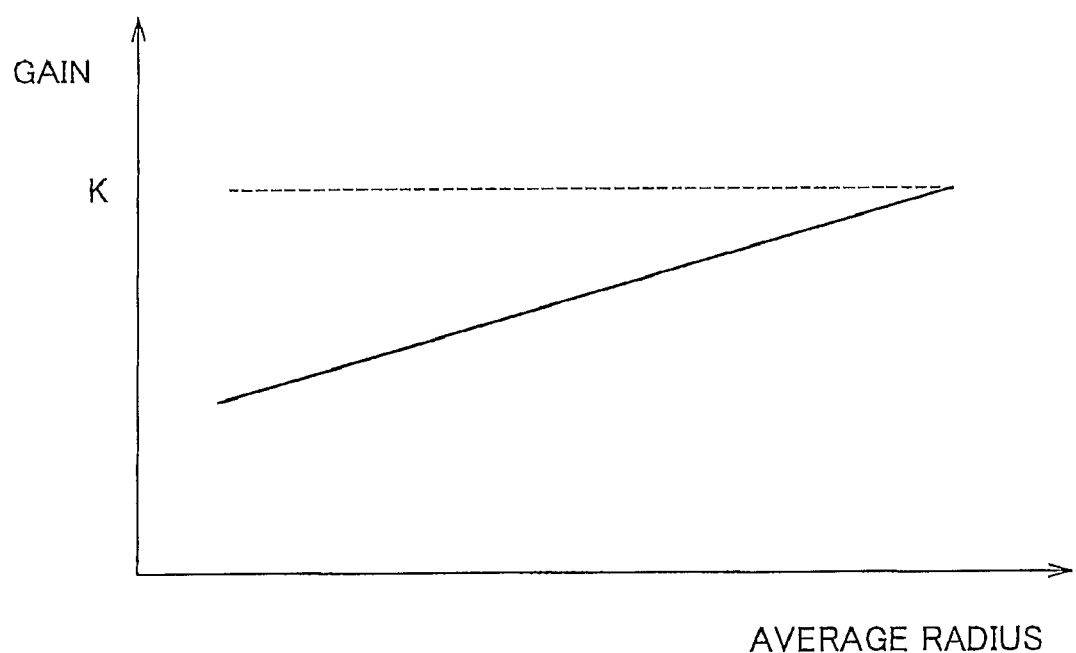
FIG. 24 is the graph showing the relationship between the average radius and the gain, which is used in the drive power control apparatus for a vehicle according to the fifth embodiment of the invention.

Next, the routine executed according to the fifth embodiment of the invention will be described with reference to FIG. 23.

Because steps S110 and S120 are the same as steps S1 and S3 in FIG. 1, respectively, the description thereof will not be provided below.

In step S130, it is determined whether the vehicle is traveling on the road in which there are successive curves. The determination is made in the following manner. First, the total sum of the turning angles within a region having a predetermined length is calculated in real time. Then, it is determined whether the vehicle is traveling on the road in which there are successive curves based on whether the total sum is equal to or greater than a predetermined value.

Alternatively, it may be determined whether the vehicle is traveling on the road in which there are successive curves based on whether a curve having a curvature equal to or greater than a predetermined value is present within the region having a predetermined length and/or the number of curves each of which has a curvature equal to or greater than the predetermined value present within the region having the predetermined length.

Alternatively, the region in which there are successive curves may be stored in advance in the navigation system 95 as the map information, and it may be determined whether the vehicle is traveling on the road in which there are successive curves based on the stored information. If it is determined that the vehicle is traveling on the road in which there are successive curves, step S140 is executed. On the other hand, if it is determined that the road on which the vehicle is traveling is not a road in which there are successive curves, step S150 is executed.

In step S140, the average value of the radiuses of the curves within the region having the predetermined length is calculated. The average value is calculated by dividing the sum of the minimum values of the radiuses of the curves by the number of curves.

In step S150, the control gain is calculated. When the road on which the vehicle is traveling is not a road in which there are successive curves ("NO" in step S130), the control gain is set to the preset gain K (see FIG. 24). On the other hand, if it is determined that the vehicle is traveling on a road in which there are successive curves ("YES" in step S130), the control gain is calculated based on the average value of the radiuses of the curves within the region having the predetermined length. As the average value of the radiuses of the curves within the region having the predetermined length decreases, the control gain is set to a value that is smaller than the gain K by a greater amount.

In step S160, the target throttle valve opening amount is calculated. The final target throttle valve opening amount is calculated by reflecting the control gain on the target throttle valve opening amount calculated in the same method as that used in step S2 in FIG. 1. When the control gain is set to the gain K, the target throttle valve opening amount is the same value as that when the control according to the fifth embodiment of the invention is not executed (=the sum of the throttle valve opening amount 507 and the throttle valve opening amount 508). When the control gain is less than the gain K, the target throttle valve opening amount is less than the sum of the throttle valve opening amount 507 and the throttle valve opening amount 508 by the amount corresponding to the difference between the control gain and the gain K. In the example shown in FIG. 26, because the control gain is set to a value (not shown) less than the gain K, the target throttle valve opening amount is the sum of the throttle valve opening amount 507 and the throttle valve opening amount 509.

In step S170, the target throttle valve opening amount is corrected (the corrected target throttle valve opening amount is calculated). The corrected target throttle valve opening amount is calculated by the equation 4 used in step S4 in FIG. 1. In the example in FIG. 26, the corrected target throttle valve opening amount is the sum of the throttle valve opening amount 507 and the throttle valve opening amount 506.

Step S180 is the same as step S5 in FIG. 1. The control is executed so that throttle valve opening amount is equal to the corrected target throttle valve opening amount.

According to the fifth embodiment of the invention, when the vehicle is traveling on the road in which there are successive curves, the control gain is less than that when the road on which the vehicle is traveling is not a road in which there are successive curves. Accordingly, the target throttle valve opening amount is less than that when the road on which the vehicle is traveling is not a road in which there are successive curves. In the example in FIG. 26, the target throttle valve opening amount when the road on which the vehicle is traveling is not a road in which there are successive curves is the sum of the throttle valve opening amount 507 and the throttle valve opening amount 508. In contrast, the target throttle valve opening amount when the vehicle is traveling on the road in which there are successive curves is the sum of the throttle valve opening amount 507 and the throttle valve opening amount 506. Accordingly, when the vehicle is traveling on the road in which there are successive curves, the difference in the drive power adjustment amount between when the vehicle is going round a curve and when the vehicle has passed through the curve is made less than that when the road on which the vehicle is traveling is not a road in which there are successive curves. Thus, a sense of discomfort felt by the driver is suppressed.

Unlike the drive power adjustment amount 505 when the road on which the vehicle is traveling is not a road in which there are successive curves, the amount by which the drive power adjustment amount 506 is decreased when the vehicle is traveling on the road in which there are successive curves is increased and decreased based on the average size (radius) of the successive curves. Accordingly, the drivability further improves.

According to the third embodiment of the invention, the drive power adjustment amount is decreased based on the estimated maximum lateral acceleration applied to the vehicle before the vehicle enters a curve. When the control according to the fifth embodiment is executed instead of the control according to the third embodiment or when the control according to the fifth embodiment is executed in combination with the control according to the third embodiment, the amount by which the drive power adjustment amount is decreased is changed based on whether the vehicle is traveling on a road in which there are successive curves and the number of curves (as the number of curves increases, the amount, by which the drive power adjustment amount is decreased, is increased).

Figure 27:
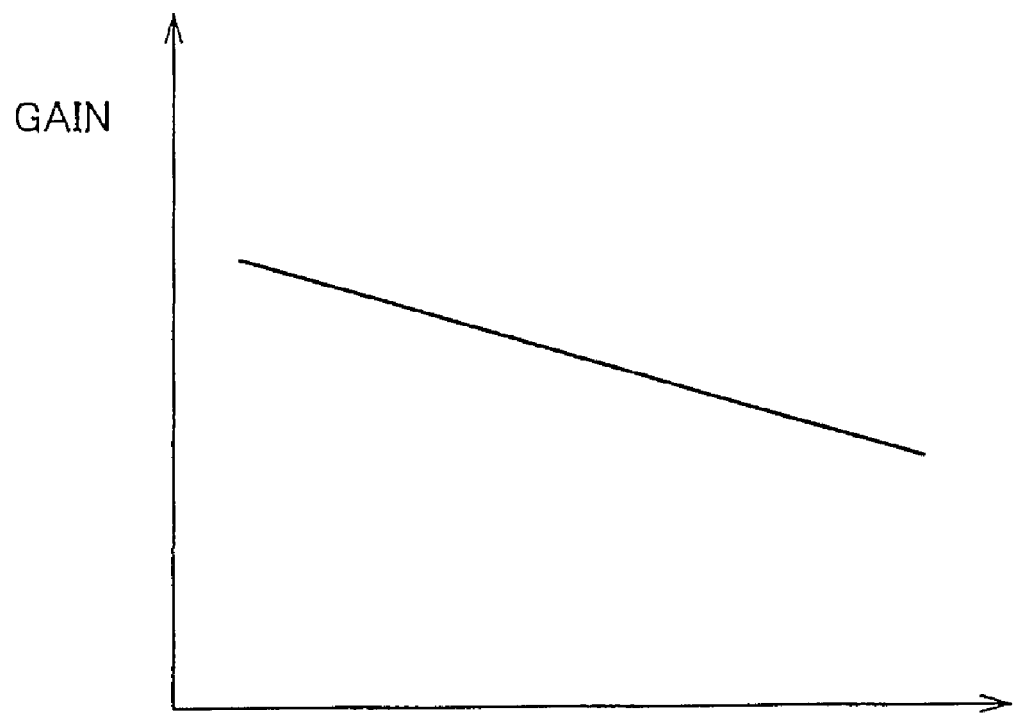
FIG. 27 is the graph showing the relationship between the driving manner and the gain, which is used in a drive power control apparatus for a vehicle according to a first modified example of the fifth embodiment of the invention.

A first modified example of the fifth embodiment of the invention will be described below. According to the fifth embodiment of the invention, when the vehicle is traveling on a road in which there are successive curves, the control gain is calculated based on the average value of the radiuses of the curves. In contrast, according to the first modified example, the control gain may be variably set based on the driving manner of the driver. As shown in FIG. 27, when the driver has a high degree of sport-orientation, the control gain is set to a small value. This is because, it is considered that the driver having higher sport-orientation tends to prefer less drive power adjustment amount.

Figure 28:
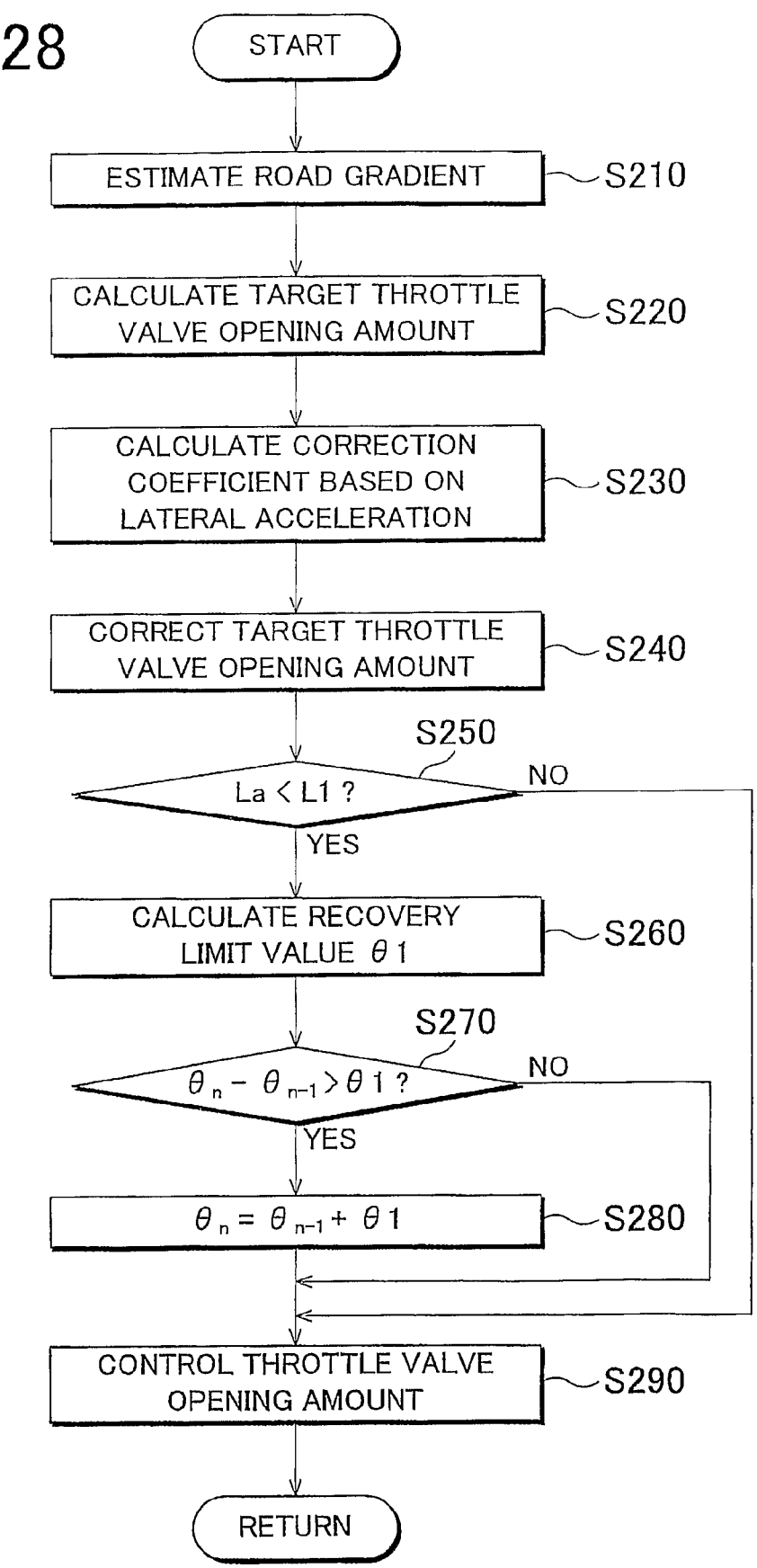
FIG. 28 is the flowchart showing the routine executed by a drive power control apparatus for a vehicle according to a sixth embodiment of the invention.
Figure 29:
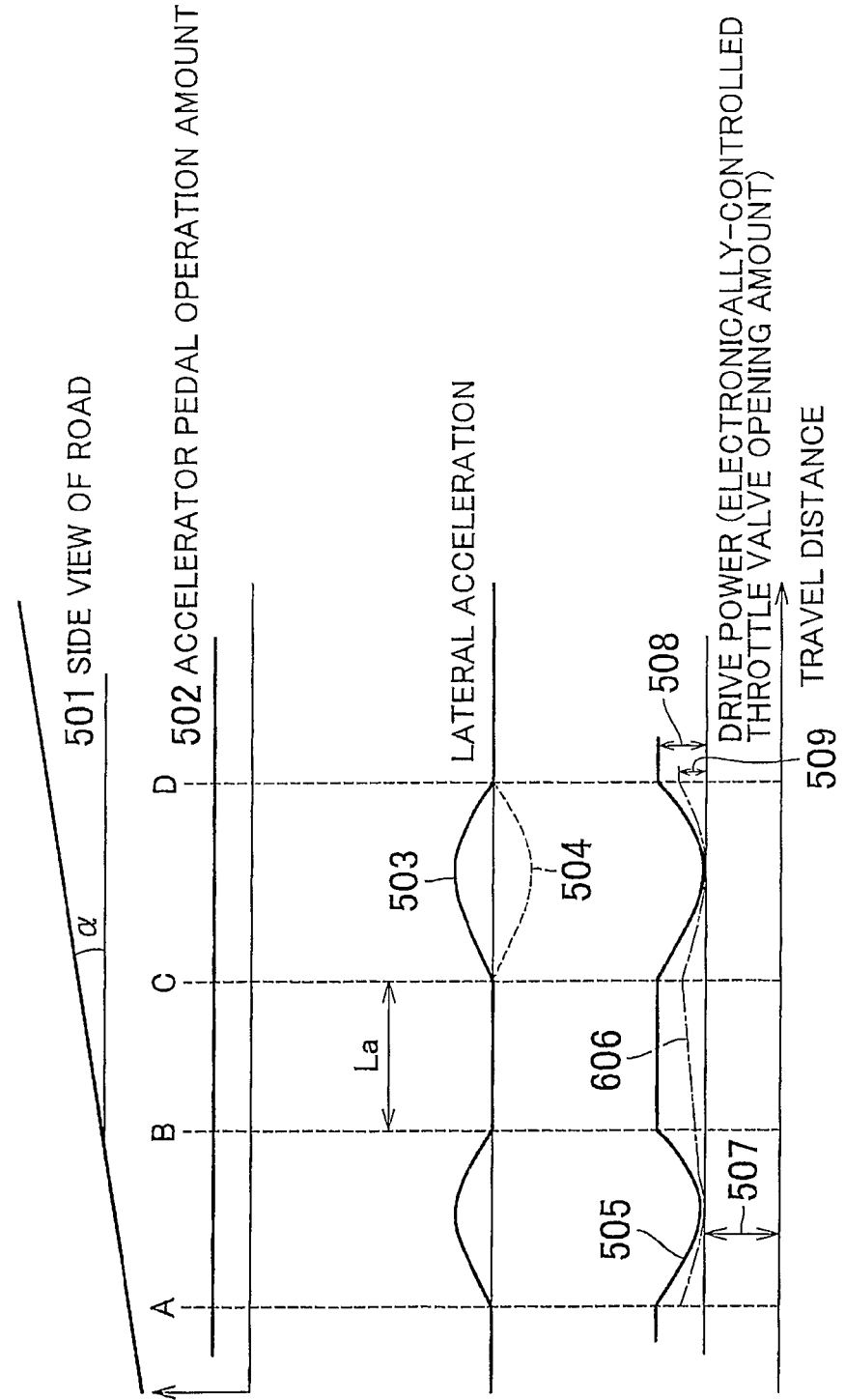
FIG. 29 is the chart for describing the operation of the drive power control apparatus for a vehicle according to the sixth embodiment of the invention.

A drive power control apparatus and method according to a sixth embodiment of the invention will be described below with reference to FIGS. 28 and 29. In the sixth embodiment of the invention, the description on the same portions as those in the embodiments and the modified examples of the embodiments described above will not be provided below. The inconvenience that will be minimized according to the sixth embodiment of the invention is the same as the inconvenience that will be minimized by the fifth embodiment of the invention.

According to the fifth embodiment of the invention, when the vehicle is traveling on a road in which there are successive curves, the drive power adjustment amount 506 (509) including the drive power adjustment amount 506 when the vehicle is traveling on the straight road (from point B to point C in FIG. 26) is made less than that when the road on which the vehicle is traveling is not a road in which there are successive curves. In contrast, according to the sixth embodiment of the invention, when the vehicle is traveling on a road in which there are successive curves, recovery from the drive power adjustment amount when the vehicle is going round a curve to the drive power adjustment amount when the vehicle is traveling on a straight road is limited or retarded when the vehicle goes out of the curve or when the vehicle has passed through the curve. Thus, a sense of discomfort felt by the driver when the vehicle is traveling on the road in which there are successive curves is reduced.

Next, the routine executed according to the sixth embodiment of the invention will be described with reference to FIG. 28.

First, the road gradient is estimated (step S210, which is the same as step S1 in FIG. 1). Next, the target throttle valve opening amount is calculated (step S220, which is the same as step S2 in FIG. 1). Then, the correction coefficient is calculated based on the lateral acceleration applied to the vehicle (step S230, which is the same as step S3 in FIG. 1). After that, the target throttle valve opening amount is corrected using the correction coefficient (the corrected target throttle valve opening amount is calculated) (step S240, which is the same as step S4 in FIG. 1).

Next, in step S250, it is determined whether the distance La from the end point of the curve on which the vehicle is currently traveling to the start point of the subsequent curve is equal to or less than a predetermined value L1. In the example in FIG. 29, it is determined whether the distance La between point B and point C is equal to or less than the predetermined value L1. If a negative determination is made, step S290 is executed.

In step S260, the recovery limit value $\theta 1$ is calculated. The recovery limit value $\theta 1$ will be described below. According to the first embodiment of the invention, when the vehicle is going round a curve (when the absolute value of a relatively great lateral acceleration is detected), the amount by which drive power is adjusted to compensate for the external factor-related parameters including the road gradient is decreased. Before the vehicle goes out of the curve (when the detected absolute value of the lateral acceleration is equal to or close to 0), the amount, by which the driving adjustment amount is decreased, is decreased (the drive power adjustment amount is recovered to the drive power adjustment amount for a straight road).

When the distance L between the current vehicle position and the entrance of the subsequent curve is short, if the drive power adjustment amount is rapidly recovered, the driver may feel a sense of discomfort. This is because the drive power adjustment amount is recovered rapidly and the accelerator pedal has been depressed to go out of the curve. Accordingly, when the driver fully releases the accelerator pedal before the vehicle enters the subsequent curve, the vehicle speed is not sufficiently decreased and the driver may feel a sense of discomfort. Immediately before the vehicle reaches the end point of the curve, if the drive power adjustment amount is rapidly increased, the difference is increased in the drive power between when the vehicle is going round a curve and when the vehicle is not going round a curve.

According to the sixth embodiment of the invention, the recovery limit value $\theta 1$ is set to limit an increase in the throttle valve opening amount, which is caused when the throttle valve opening amount control is executed once, in order to suppress rapid recovery of the drive power adjustment amount. The recovery limit value $\theta 1$ is the upper limit of the increase in the throttle valve opening amount, which is caused when the throttle valve opening amount control is executed once.

Figure 30:
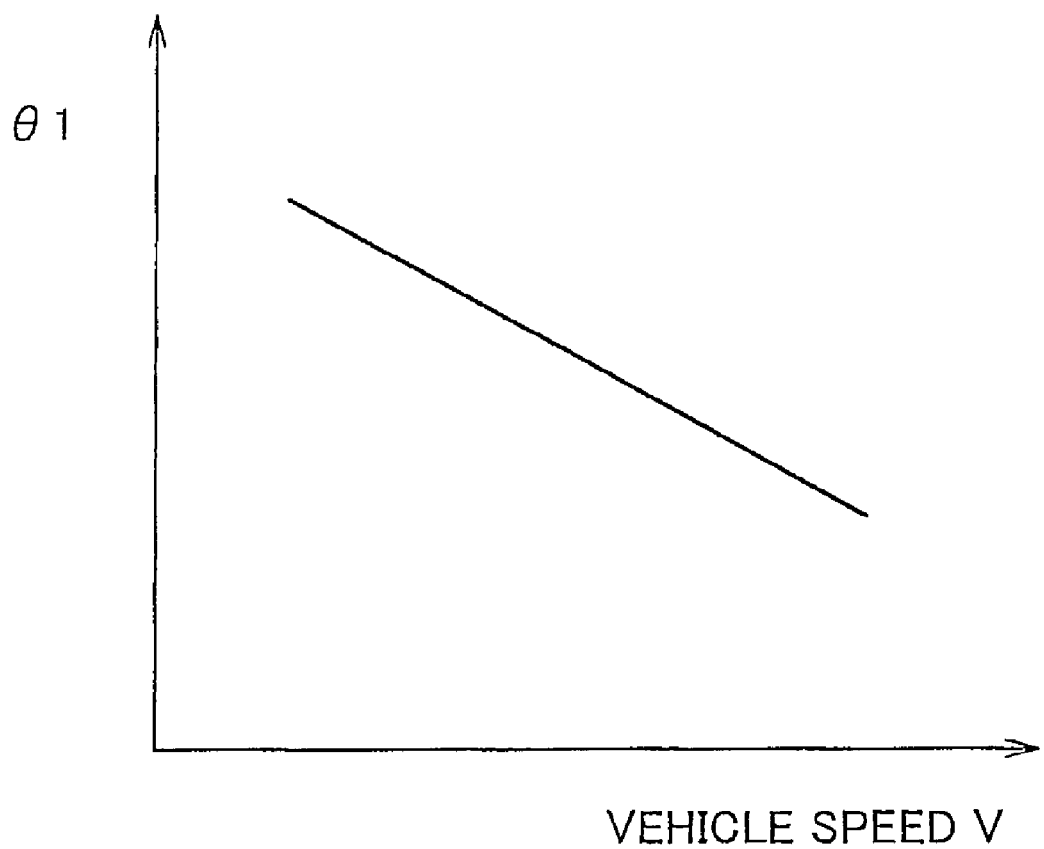
FIG. 30 is the graph showing the relationship between the vehicle speed and the recovery limit value, which is used in the drive power control apparatus for a vehicle according to the sixth embodiment of the invention.
Figure 31:
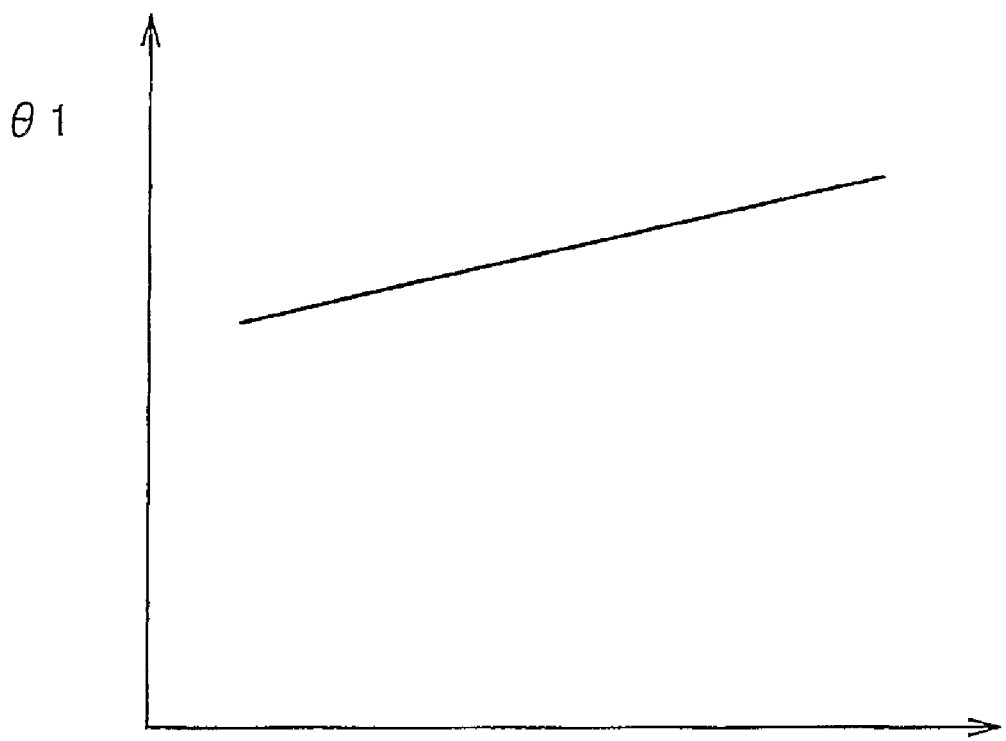
FIG. 31 is the graph for describing the relationship between the curvature of a curve and the recovery limit value, which is used in the drive power control apparatus for a vehicle according to the sixth embodiment of the invention.

The recovery limit value $\theta 1$ may be variably set based on the vehicle speed, the curvature of the subsequent curve (the curve subsequent to the point at which the drive power adjustment amount is recovered), etc. As shown in FIG. 30, when the vehicle speed is high, the recovery limit value $\theta 1$ is set to a small value, and the increase in the throttle valve opening amount, which is caused when the throttle valve opening amount control is executed once, is suppressed to a small value. As shown in FIG. 31, when the curvature of the subsequent curve is great, the recovery limit value $\theta 1$ is set to a great value to permit a large increase in the throttle valve opening amount, which is caused when the throttle valve opening amount control is executed once.

Next, in step S270, the corrected target throttle valve opening amount $\theta n-1$ calculated in step S240 in the immediately preceding routine and the corrected target throttle valve opening amount θn calculated in step S240 in the current routine are compared with each other. It is determined whether the increase from the corrected target throttle valve opening amount (θn−1) calculated in step S240 in the immediately preceding routine to the corrected target throttle valve opening amount θn in step S240 in the current routine is greater than the recovery limit value θ1. If it is determined that the increase is greater than the recovery limit value θ1, step S280 is executed. If a negative determination is made, step S290 is executed.

In step S280, the corrected target throttle valve opening amount θn is calculated by the following equation, and the increase in the throttle valve opening amount controlled in the current routine is limited.

$$\theta n = (\theta n-1) + \theta 1$$

By the equation described above, the upper limit of the increase from the corrected target throttle valve opening amount (θn−1) calculated in step S240 in the immediately preceding routine to the corrected target throttle valve opening amount θn in step S240 in the current routine is set to the recovery limit value θ1. As shown by the above equation, if the recovery limit value θ1 is set to 0 in step S260, the recovery of the throttle valve opening amount (the control for increasing the throttle valve opening amount) is not executed in the current routine.

In step S290, the control is executed so that the throttle valve opening amount is equal to the corrected target throttle valve opening amount θn (the same as step S5 in FIG. 1). If a negative determination is made in step S250, the throttle valve opening amount control that is the same as the throttle valve opening amount control according to the first embodiment of the invention (the drive power adjustment amount control that does not differ between when the vehicle is traveling on a road in which there are successive curves and when the road on which the vehicle is traveling is not a road in which there are successive curves) is executed.

Next, the effects of the sixth embodiment of the invention will be described with reference to FIG. 29. The same portions as those in FIG. 26 are denoted by the same reference numerals, and the description thereof will not be provided below.

According to the first embodiment of the invention, when the vehicle is going round a curve (from point A to point B), the drive power adjustment amount 505 used to compensate for the road gradient is decreased. Immediately before the vehicle reaches the end point of the curve (from a point before point B to point B), the amount, by which the drive power adjustment amount 505 is decreased, is decreased (the drive power adjustment amount 505 is recovered). At this time, when the distance La between the current vehicle position and the entrance of the subsequent curve (from point C to point D) is short, if the drive power adjustment amount 505 is abruptly recovered, the drive power is increased because the drive power adjustment amount is recovered and the accelerator pedal is depressed to go out of the curve. Accordingly, when the driver fully releases the accelerator pedal before the vehicle enters the subsequent curve, the vehicle speed is not sufficiently decreased and the driver may feel a sense of discomfort.

Accordingly, the upper limit (the recovery limit value θ1) is set to limit the increase in the throttle valve opening amount, which is caused when the throttle valve opening amount control is executed once, and the drive power adjustment amount 606 is increased by an amount equal to or less than the recovery limit value θ1. Thus, when the driver fully releases the accelerator pedal before the vehicle enters the subsequent curve, the vehicle speed is sufficiently decreased, and a sense of discomfort felt by the driver is suppressed, because the drive power adjustment amount 606 is not considerably great.

A first modified example of the sixth embodiment of the invention will be described below. The predetermined value L1 used in step S250 in the sixth embodiment of the invention may be variably set based on the states of the vehicle and the driver as described below.

Figure 32:
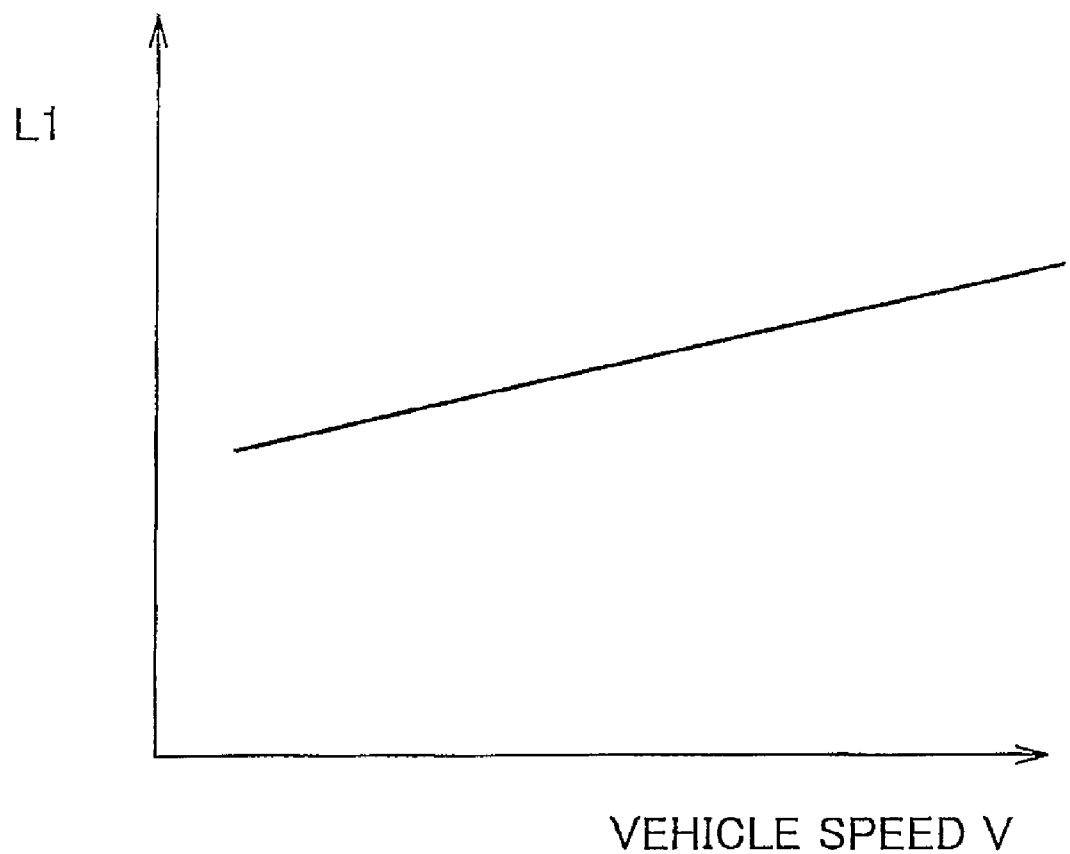
FIG. 32 is the graph for describing the relationship between the vehicle speed and the predetermined value, which is used in a drive power control apparatus for a vehicle according to a first modified example of the sixth embodiment of the invention.

For example, the predetermined value L1 may be variably set based on the vehicle speed as shown in FIG. 32. When the vehicle speed is high, the predetermined value L1 is set to a great value. When the vehicle speed is high, the vehicle reaches an entrance of the subsequent curve in a short time. Accordingly, even if the distance L between the end point of the curve on which the vehicle is currently traveling and the entrance of the subsequent curve is relatively long, the recovery of the throttle valve opening amount should be limited.

For example, the predetermined value L1 may be variably set based on the radius R of the subsequent curve, as shown in FIG. 33. When the radius R of the subsequent curve is great (when the curvature of the curve is small), the predetermined value L1 is set to a small value. When the radius R of the subsequent curve is great, the necessity to limit the recovery of the throttle valve opening amount is not very high. Accordingly, only when the distance L between the end point of the curve on which the vehicle is currently traveling and the entrance of the subsequent curve is sufficiently long, the recovery of the throttle valve opening amount is limited.

For example, the predetermined value L1 may be variably set based on the driving manner (the degree of sport-orientation) of the driver, as shown in FIG. 34. When the driver has the sport-oriented driving manner, the predetermined value L1 is set to a great value. When the driver has the sport-oriented driving manner, even if the distance between the end point of the curve on which the vehicle is currently traveling and the entrance of the subsequent curve is relatively long, it is considered that the driver prefers that the recovery of the throttle valve opening amount is limited.

The invention claimed is:

1. A drive power control apparatus for a vehicle comprising:
a controller that adjusts a drive power for driving a vehicle by adding, to a reference drive power, a drive power adjustment amount by which the drive power is adjusted, to compensate for a parameter outside said drive power control apparatus due to which a deviation between a nominal vehicle speed required by a driver and an actual vehicle speed or a deviation between a nominal acceleration required by the driver and an actual acceleration is generated, wherein
when the vehicle enters into a curve or when the vehicle is traveling in the curve, the controller makes the drive power adjustment amount by which the drive power is adjusted less than the drive power adjustment amount by which the drive power is adjusted when the vehicle enters into a non-curve road or when the vehicle is traveling in the non-curve road, while maintaining the reference drive power.

2. The drive power control apparatus according to claim 1, wherein the parameter includes at least one of a road gradient, a cornering resistance, a vehicle weight, an altitude of a region in which the vehicle travels, a road-surface resistance, a variation in performance of an engine of the vehicle, and a variation in a slide resistance and an oil resistance that interfere with a rotation of a transmission of the vehicle.

3. The drive power control apparatus according to claim 1, wherein the controller determines whether the vehicle is going round the curve based on at least one of a lateral acceleration applied to the vehicle, a manner in which the vehicle is steered, and rotational speeds of right and left wheels of the vehicle.

4. The drive power control apparatus according to claim 1, wherein the controller determines a decrease amount in the drive power adjustment amount by which the drive power is adjusted when the vehicle is going round the curve based on a lateral acceleration applied to the vehicle.

5. The drive power control apparatus according to claim 4, wherein the controller increases the decrease amount in the drive power adjustment amount by which the drive power is adjusted as the lateral acceleration increases.

6. The drive power control apparatus according to claim 1, wherein the controller sets a corrected parameter to a value obtained by subtracting a cornering resistance of the vehicle from the parameter, and decreases the amount by which the drive power is adjusted when the vehicle is going round the curve based on the corrected parameter.

7. The drive power control apparatus according to claim 1, wherein the controller determines whether the vehicle will enter the curve based on at least one of map information stored in a vehicle compartment of the vehicle, and information provided from an outside of the vehicle.

8. The drive power control apparatus according to claim 1, wherein before the vehicle enters the curve, the controller estimates the lateral acceleration that will be applied to the vehicle if the vehicle goes round the curve, and sets a decrease amount in the amount by which the drive power is adjusted based on the estimated lateral acceleration.

9. The drive power control apparatus according to claim 8, wherein the controller estimates the lateral acceleration based on a radius of the curve ahead of the vehicle.

10. The drive power control apparatus according to claim 1, wherein:
when the vehicle is running on an uphill slope, the controller adjusts the drive power by adding an adjustment drive power to the reference drive power of the vehicle to compensate for the parameter, and
a decrease amount in the amount by which the drive power is adjusted is a decrease amount in the adjustment drive power.

11. The drive power control apparatus according to claim 1, wherein:
when the vehicle is running on a downhill slope, the controller adjusts the drive power by subtracting an adjustment drive power from the reference drive power of the vehicle to compensate for the parameter, and
a decrease amount in the amount by which the drive power is adjusted is a decrease amount in the adjustment drive power.

12. The drive power control apparatus according to claim 11, wherein the controller decreases the amount by which the drive power is adjusted when an accelerator pedal is fully released.

13. The drive power control apparatus according to claim 1, wherein the controller sets a decrease amount in the amount by which the drive power is adjusted when the vehicle enters a region in which the acceleration of the vehicle needs to be changed based on a running environment, based on a deceleration required to travel in the region.

14. The drive power control apparatus according to claim 13, wherein the controller determines the required deceleration based on a distance between the vehicle and an entrance of the curve ahead of the vehicle, a radius of the curve, and a vehicle speed.

15. The drive power control apparatus according to claim 14, wherein:
the controller determines the decrease amount in the amount by which drive power is adjusted, based on the required deceleration, when the distance between the vehicle and the entrance of the curve is equal to or longer than a predetermined value, and
the controller determines the decrease amount in the amount by which the drive power is adjusted, based on an estimated lateral acceleration as the lateral acceleration applied to the vehicle, estimated on the assumption that the vehicle is going round the curve, when the distance between the vehicle and the entrance of the curve is equal shorter than the predetermined value.

16. The drive power control apparatus according to claim 1, wherein the controller determines the decrease amount in the amount by which the drive power is adjusted when the vehicle enters a region in which the acceleration of the vehicle needs to be changed based on a running environment, based on a driving manner of a driver of the vehicle.

17. The drive power control apparatus according to claim 1, wherein the controller executes control so that the drive power for driving the vehicle when the vehicle is traveling on a road in which there are successive curves is less than the drive power for driving the vehicle when a road on which the vehicle is traveling is not a road in which there are successive curves.

18. The drive power control apparatus according to claim 17, wherein the controller executes control so that a gain of the drive power for driving the vehicle, which is the amount by which the drive power is adjusted, when the vehicle is traveling on the road in which there are successive curves is less than the gain of the drive power when the road on which the vehicle is traveling is not a road in which there are successive curves.

19. The drive power control apparatus according to claim 18, wherein the controller calculates the gain of the drive power based on an average value of radiuses of the multiple curves in the road in which there are successive curves.

20. The drive power control apparatus according to claim 17, wherein, in a case where the vehicle is traveling on the road in which there are successive curves, recovery of control of the drive power for driving the vehicle to normal-time control is retarded as compared with a case where the road on which the vehicle is traveling is not a road in which there are successive curves.

21. The drive power control apparatus according to claim 17, wherein the controller determines whether the vehicle is traveling on the road in which there are successive curves based on map information.

22. The drive power control apparatus according to claim 17, wherein the controller determines whether the vehicle is traveling on the road in which there are successive curves based on at least one of whether a curve having a curvature equal to or greater than a predetermined value is present within a region having a predetermined length and the number of curves, each of which has a curvature equal to or greater than the predetermined value, present within the region have the predetermined length.

23. The drive power control apparatus according to claim 1, wherein, when the vehicle is traveling on the road in which there are successive curves, the controller sets a limit value which is used to limit an increase in the amount by which the drive power is adjusted when control of the drive power is recovered to normal-time control.

24. The drive power control apparatus according to claim 23, wherein the controller sets the limit value based on at least one of:
- i) a distance La between an end point of the curve on which the vehicle is traveling and an entrance of a subsequent curve,
- ii) a vehicle speed,
- iii) a radius of the subsequent curve, and
- iv) a driving manner.

25. The drive power control apparatus according to claim 23, wherein the controller determines whether the vehicle is traveling on the road in which there are successive curves based on map information.

26. The drive power control apparatus according to claim 23, wherein the controller determines whether the vehicle is traveling on the road in which there are successive curves based on at least one of whether (i) a curve having a curvature equal to or greater than a predetermined value is present within a region having a predetermined length and (ii) the number of curves, each of which has a curvature equal to or greater than the predetermined value, present within the region having the predetermined length.

27. A drive power control method for a vehicle, comprising:
- a first step in which a drive power for driving a vehicle by adding, to a reference drive power, a driver power adjustment amount by which the driver power is adjusted to compensate for a parameter outside said drive power control method that affects a running state of the vehicle due to which a deviation between a nominal vehicle speed required by a driver and an actual vehicle speed or a deviation between a nominal acceleration required by the driver and an actual acceleration is generated, and
- a second step in which, when the vehicle enters into a curve or when the vehicle is traveling in the curve, the drive power adjustment amount by which the drive power is adjusted is made less than the driver power adjustment amount by which the drive power is adjusted when the vehicle enters into a non-curve road or when the vehicle is traveling in the non-curve road while maintaining the reference driver power.

28. The drive power control method according to claim 27, wherein:
- the first step includes a step in which the drive power is adjusted by adding an adjustment drive power to a reference drive power of the vehicle to compensate for the vehicle running on an uphill slope; and
- the second step includes a step in which the adjustment drive power is decreased.

29. The drive power control method according to claim 28, wherein:
- the first step includes a step in which the drive power is adjusted by subtracting an adjustment drive power from a reference drive power of the vehicle to compensate for the vehicle running on a downhill slope; and
- the second step includes a step in which the adjustment drive power is decreased.

* * * * *